United States Patent
Montague et al.

(10) Patent No.: US 12,330,747 B2
(45) Date of Patent: *Jun. 17, 2025

(54) ANISOTROPICALLY FLEXIBLE VIBRATION ISOLATING COUPLING MECHANISM

(71) Applicant: Kai Concepts, LLC, Alameda, CA (US)

(72) Inventors: Donald Lewis Montague, Paia, HI (US); Joseph Andrew Brock, Alameda, CA (US); Tomasz Pawel Bartczak, Toronto (CA); Matthew Campbell Greaves, Corinda (AU); Alec Korver, Monument, CO (US); Jamieson Edward Schulte, Alameda, CA (US); Dmitri Stepanov, San Francisco, CA (US)

(73) Assignee: Kai Concepts, LLC, Alameda, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/371,119

(22) Filed: Sep. 21, 2023

(65) Prior Publication Data

US 2024/0010298 A1 Jan. 11, 2024

Related U.S. Application Data

(63) Continuation of application No. 17/397,563, filed on Aug. 9, 2021, now Pat. No. 11,801,914, which is a
(Continued)

(51) Int. Cl.
*B63B 1/24* (2020.01)
*B60L 50/50* (2019.01)
(Continued)

(52) U.S. Cl.
CPC .............. *B63B 1/242* (2013.01); *B60L 50/50* (2019.02); *B63B 1/246* (2013.01); *B63B 1/248* (2013.01);
(Continued)

(58) Field of Classification Search
CPC ......... B63B 1/242; B63B 1/246; B63B 1/248; B63B 32/10; B60L 50/50; B60L 2200/32;
(Continued)

(56) References Cited

U.S. PATENT DOCUMENTS

| | | | |
|---|---|---|---|
| 2,370,508 | A | 2/1945 | Wilkie |
| 3,165,888 | A | 1/1965 | Keon |

(Continued)

FOREIGN PATENT DOCUMENTS

| | | |
|---|---|---|
| CN | 101870344 A | 10/2010 |
| CN | 103373453 A | 10/2013 |

(Continued)

OTHER PUBLICATIONS

International Search Report and Written Opinion for International Application No. PCT/US2021/028376 dated Jul. 26, 2021.
(Continued)

*Primary Examiner* — Stephen P Avila
(74) *Attorney, Agent, or Firm* — Fitch, Even, Tabin & Flannery LLP

(57) ABSTRACT

A flexible coupling mechanism may be used to suspend a structural component, such as a propulsion pod, from a support member, such as a strut of a hydrofoil watercraft. The flexible coupling mechanism may include multiple vibration isolating mounts configured to extend through the support member to suspend the structural component. The vibration isolating mounts may include a plurality of elastomeric bushings configured to prevent direct contact between a component rigidly coupled to the support member
(Continued)

and a component rigidly coupled to the structural component. The elastomeric bushings may include a tapered outer profile configured to provide a nonlinear force feedback profile in response to rotation of the support member relative to the structural component.

20 Claims, 36 Drawing Sheets

Related U.S. Application Data continuation of application No. 17/077,949, filed on Oct. 22, 2020, now Pat. No. 11,084,556.

(60) Provisional application No. 63/079,909, filed on Sep. 17, 2020, provisional application No. 63/014,014, filed on Apr. 22, 2020.

(51) Int. Cl.
  *B63B 32/10* (2020.01)
  *B63H 1/14* (2006.01)
  *B63H 5/125* (2006.01)
  *B63H 21/17* (2006.01)

(52) U.S. Cl.
  CPC .............. *B63B 32/10* (2020.02); *B63H 1/14* (2013.01); *B63H 5/125* (2013.01); *B63H 21/17* (2013.01); *B60L 2200/32* (2013.01); *B63H 2005/1254* (2013.01)

(58) Field of Classification Search
  CPC .......... B63H 1/14; B63H 5/125; B63H 21/17; B63H 2005/1254
  See application file for complete search history.

(56) References Cited

U.S. PATENT DOCUMENTS

| 3,884,174 | A | 5/1975 | Larsen |
| 3,989,002 | A | 11/1976 | Peterson |
| 4,768,983 | A | 9/1988 | Smith |
| 5,967,868 | A | 10/1999 | Ito |
| 6,073,568 | A | 6/2000 | Finley |
| 7,931,240 | B2 | 4/2011 | Kothera |
| 9,481,439 | B1 | 11/2016 | Groeschel |
| 11,084,556 | B1 * | 8/2021 | Montague ................ B63H 1/14 |
| 11,801,914 | B2 * | 10/2023 | Montague ............. B63H 5/125 |
| 2015/0104985 | A1 | 4/2015 | Langelaan |
| 2018/0023618 | A1 | 1/2018 | Galeotti |
| 2019/0367132 | A1 | 12/2019 | Montague |

FOREIGN PATENT DOCUMENTS

| CN | 208760858 U | 4/2019 |
| CN | 209366402 U | 9/2019 |
| CN | 209366403 U | 9/2019 |
| CN | 110350341 A | 10/2019 |
| CN | 209921564 U | 1/2020 |
| CN | 210364287 U | 4/2020 |
| CN | 211336359 U | 8/2020 |
| JP | 2016196210 | 11/2016 |
| JP | 2018192914 | 12/2018 |
| JP | 2019074109 | 5/2019 |
| KR | 200490972 | 1/2020 |
| WO | 2019073126 A1 | 4/2019 |

OTHER PUBLICATIONS

European Extended Search Report for Application No. 21793306.8 dated Jun. 6, 2024.

* cited by examiner

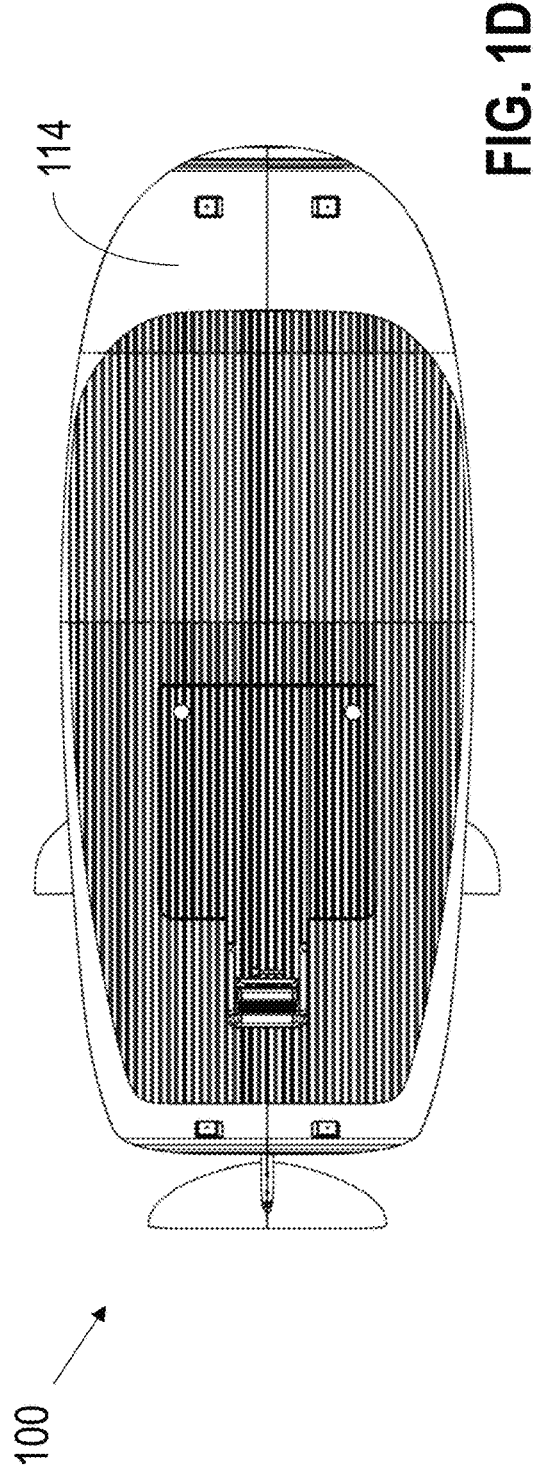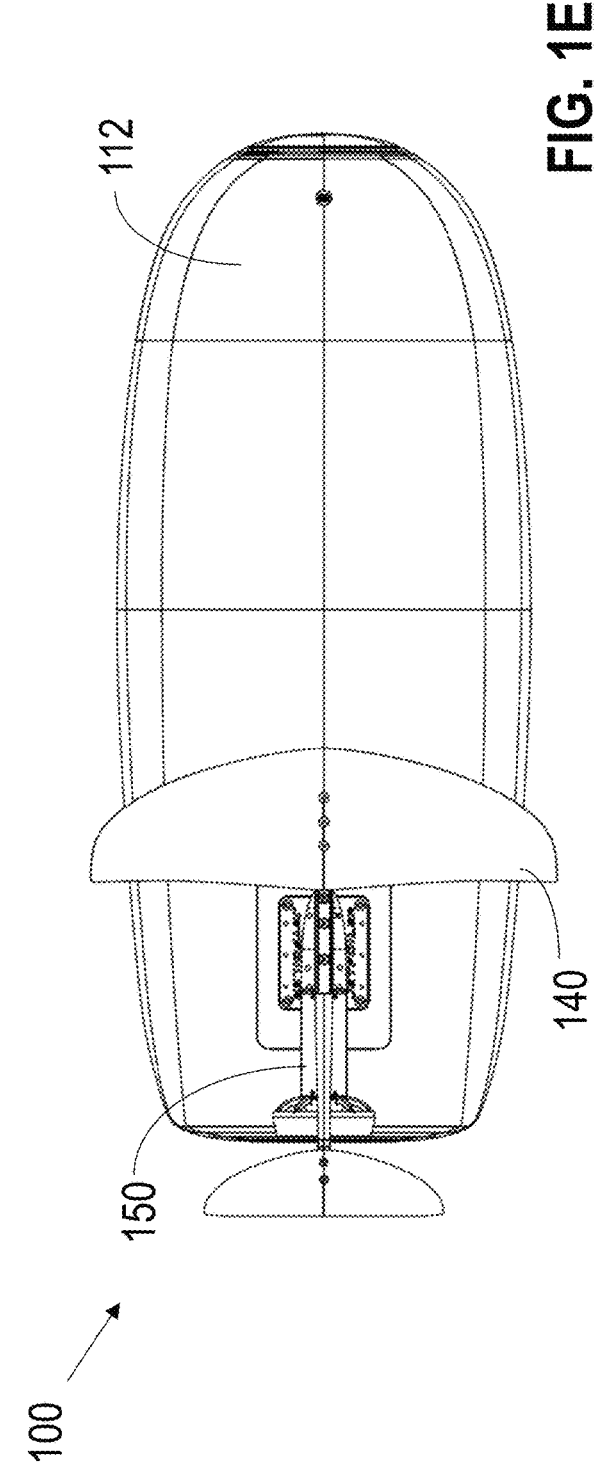

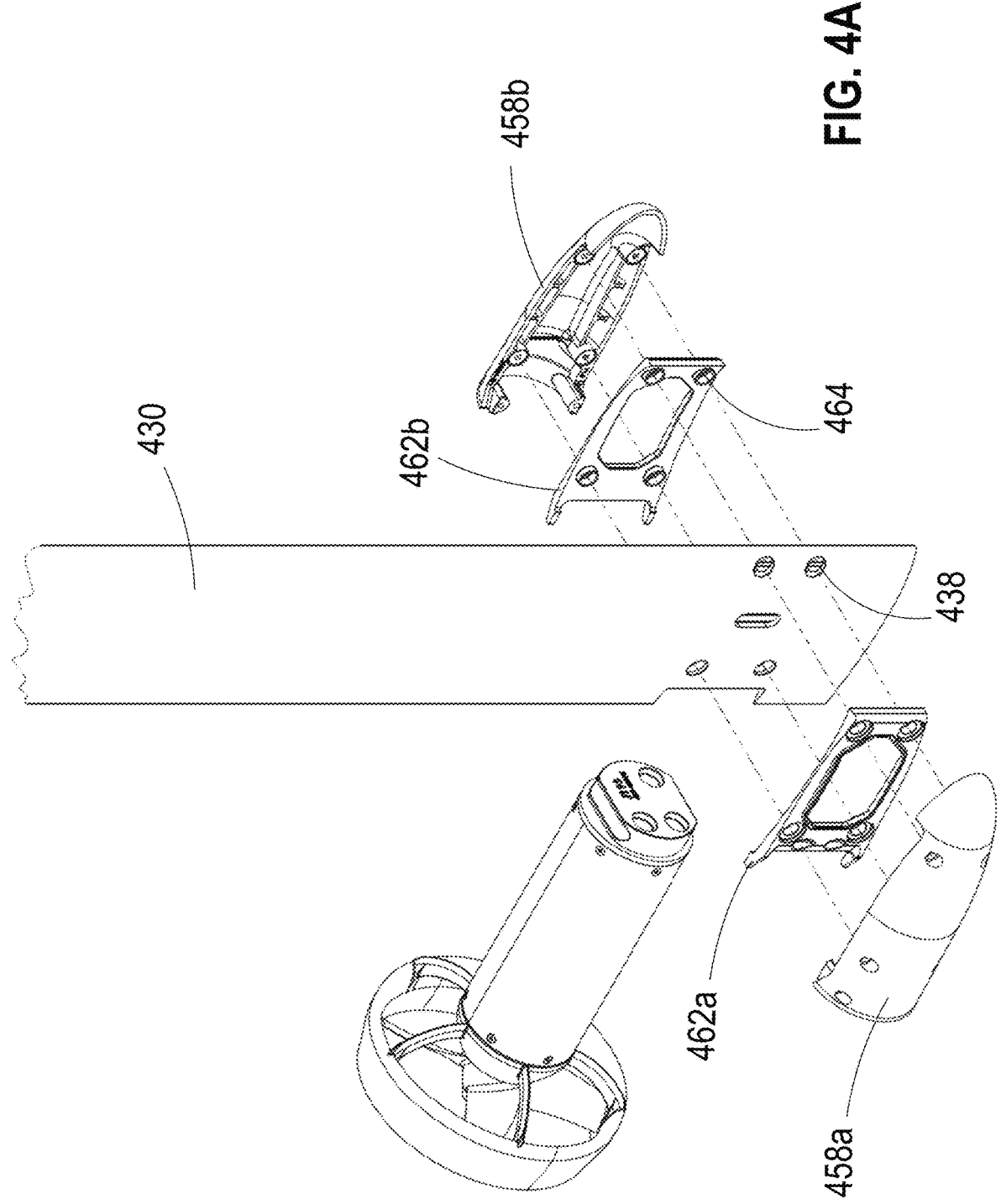

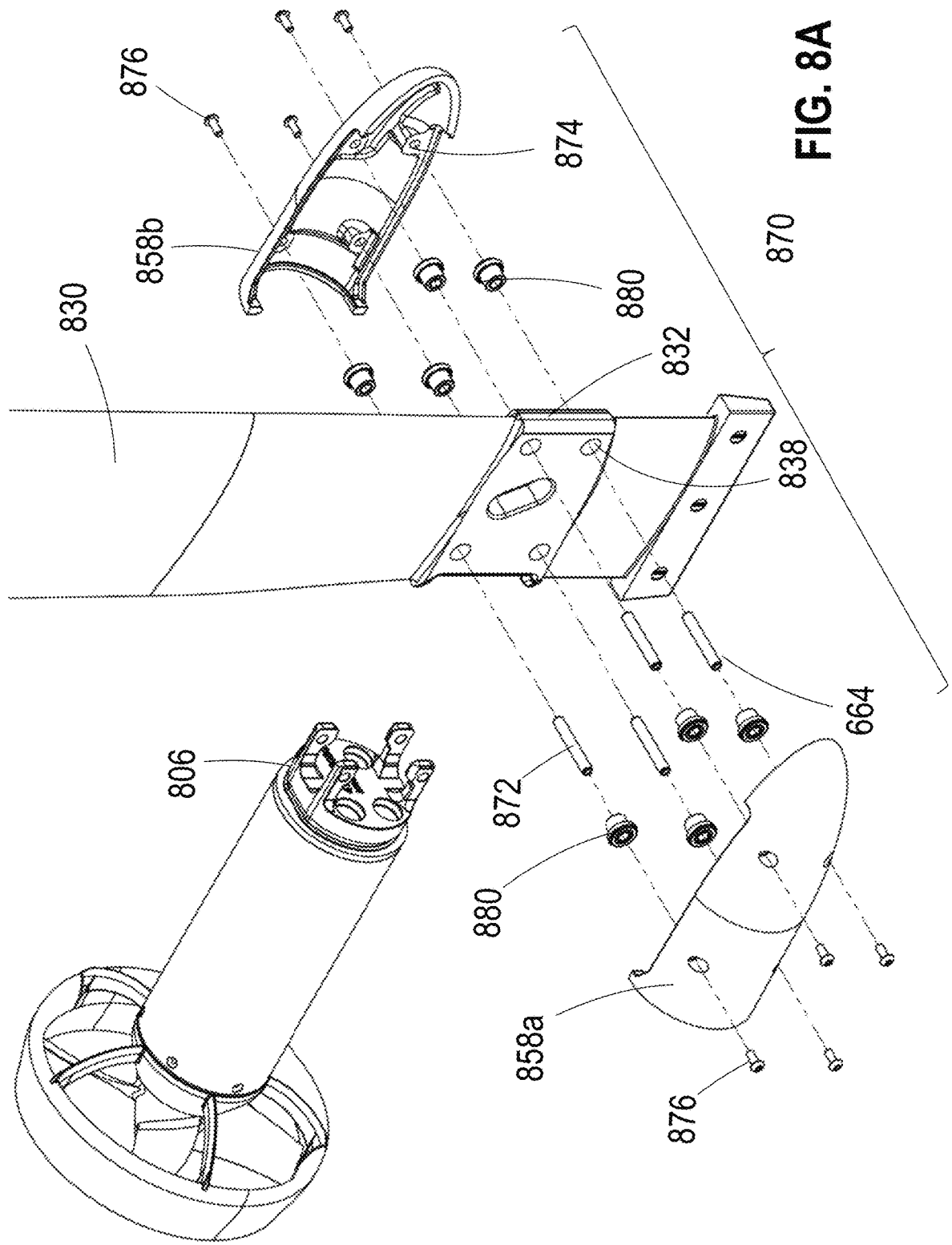

ANISOTROPICALLY FLEXIBLE VIBRATION ISOLATING COUPLING MECHANISM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application is a continuation of U.S. patent application Ser. No. 17/397,563, filed Aug. 9, 2021, which is a continuation of U.S. patent application Ser. No. 17/077,949, filed Oct. 22, 2020, which issued as U.S. Pat. No. 11,084,556 on Aug. 10, 2021, which claims the benefit of U.S. Provisional Application No. 63/079,909, filed Sep. 17, 2020 and also claims the benefit of U.S. Provisional Application No. 63/014,014, filed Apr. 22, 2020, the disclosure of each of which are all hereby incorporated by reference in their entireties.

BACKGROUND

Technical Field

The disclosed technology relates generally to vibration isolating mounts, and in particular to vibration isolating mounts which may be used to provide a coupling mechanism which can be anisotropically flexible in various directions.

Description of Related Technology

Weight-shift controlled watercraft can include a hydrofoil coupled to a supporting platform or board. A user positioned on the supporting platform can control the operation of the weight-shift controlled watercraft by shifting their weight on the board. To provide a weight-shift controlled watercraft which is responsive to the controlling motions of a user, many weight-shift controlled watercraft employ rigid couplings between various structural component, as a completely rigid coupling is viewed as providing a superior riding experience.

Because the hydrofoil and other components of the watercraft may be substantially heavier and denser than a board comprising a buoyant internal material, noises and vibrations generated by operation of the watercraft may be amplified by the board. In addition, the use of rigid coupling between the various components of the watercraft may facilitate the transmission of noise and vibrations from the driving motor to the board and may amplify the noise and vibration.

SUMMARY

In one broad aspect, a watercraft device is provided including a support platform; a strut extending from the underside of the support platform; a hydrofoil connected to the strut; and a propulsion pod supported by the strut at a location in-line with or above the hydrofoil, the propulsion pod secured to the strut by an anisotropically flexible coupling mechanism including a plurality of vibrationally isolated mounts extending through the strut, each of the plurality of vibrationally isolated mounts rigidly coupled to the propulsion pod at two locations on opposite sides of the strut.

Each of the plurality of vibrationally isolated mounts may include a rigid internal axially extending member configured to be rigidly coupled to the propulsion pod; and an elastomeric bushing radially outward of the axially extending member, the elastomeric bushing configured to retain the axially extending member, the elastomeric bushing including an inner abutment surface dimensioned to contact at least one of the strut or a retaining component rigidly coupled to the strut. Each of the plurality of vibration isolating mounts may include a first elastomeric bushing disposed at least partially on a first side of the strut; and a second elastomeric bushing disposed at least partially on a second side of the strut opposite the first side of the strut. The first and second elastomeric bushings may be axially aligned with one another, and the axially extending member may extend through both the first and second elastomeric bushings.

Each of the elastomeric bushings may include a radially inward portion having a first cross-sectional diameter, the radially inward portion dimensioned to extend at least partially into a mounting aperture in the strut; and a radially outward portion including the inner abutment surface and having a second cross-sectional diameter greater than the first cross-sectional diameter. A radially outward portion of an outer end of each of the plurality of elastomeric bushings may include a beveled shoulder section.

The outer portion of each of the plurality of elastomeric bushings may be shaped to provide a non-linear restoring force response as the strut is rotated relative to the propulsion assembly about a roll axis of the propulsion hub. Each of the elastomeric bushings may include an internal rigid sleeve surrounded by an elastomeric sleeve located radially outward of the internal rigid sleeve.

The anisotropically flexible coupling mechanism may be configured to provide less resistance to rotation of the strut relative to the propulsion assembly about a roll axis of the propulsion assembly than to rotation of the strut relative to the propulsion assembly about a pitch axis of the propulsion hub.

The watercraft device may additionally include a battery pack disposed at least partially within the support platform. An elastomeric material may be disposed between the battery pack and the support platform. The strut may include a first plug component and the battery pack may include a second plug component, the first and second plug components configured to engage with one another to form an electrical connection between the battery pack and the strut, and at least one of the first plug component or the second plug component may include an elastomeric material. An upper surface of the battery assembly may be flush with a surrounding upper surface of the support platform. The coupling between the battery assembly and the strut may reduce an intensity of vibrations transmitted to and attenuated by the support platform.

The watercraft device may additionally include an elastomeric material disposed between a mounting plate of the strut and a mounting surface on the underside of the support platform, the mounting plate of the strut coupled to the support platform by a plurality of rigid fasteners. The watercraft device may be configured to reduce generation of noise having frequencies in the range of 300 Hz to 3 kHz.

The watercraft device may include a motor controller operably connected to the motor, the motor controller configured to provide a nonlinear transition rate between motor speeds, the nonlinear transition rate configured to minimize vibration generation. The nonlinear transition rate may be a predetermined nonlinear transition profile which minimizes motor operation at speeds which generate forcing frequencies corresponding to resonant frequencies of components of the watercraft device. The nonlinear transition rate may be dynamically adjusted in response to generated vibration.

In another broad aspect, a weight-shift controlled watercraft device is provided, including a board configured to support a rider thereon; a strut extending from the underside of the board, the strut having a hydrofoil supported at a lower end of the strut; a propulsion pod including a propeller operably coupled to a driving motor; a housing, the strut extending through a portion of the housing, and a plurality of vibration isolating mounts flexibly coupling the propulsion assembly to the strut, each of the plurality of vibration isolating mounts including a fastener extending from a first side of the strut to a second side of the strut through an aperture in the strut; and an elastomeric bushing surrounding at least a portion of the fastener, the elastomeric bushing in contact with at least one of the strut or a retaining component rigidly coupled to the strut to provide vibration isolation between the propulsion pod and the strut.

The plurality of vibration isolating mounts may be configured to suspend the propulsion pod from the strut. The plurality of vibration isolating mounts may be configured to prevent direct contact between a mounting component rigidly coupled to the strut and a mounting component rigidly coupled to the propulsion pod. The elastomeric bushing may include an inner abutment surface configured to contact at least one of the strut or a retaining component rigidly coupled to the strut to provide a restoring force in response to roll of the strut relative to the propulsion pod about a rotational axis of a propeller of the propulsion pod. The inner abutment surface may be radially spaced apart from a radially inward portion of the elastomeric bushing.

In another broad aspect, a weight-shift controlled watercraft device is provided, including a board; a propulsion assembly coupled to the board, the propulsion assembly including a strut extending from the underside of the board; a hydrofoil supported at a lower end of the strut; a propulsion pod supported by the strut, the propulsion pod including a propeller operably coupled to a driving motor, and a housing dimensioned to allow the strut to extend therethrough; and a flexible coupling mechanism coupling the propulsion pod to the strut, the coupling mechanism configured to reduce vibration transfer between the propulsion pod and the board.

The coupling mechanism may include a plurality of vibration isolating mounts securing the propulsion pod to the strut, and each of the plurality of vibration isolating mounts may include a fastener extending from a first side of the propulsion pod housing to a second side of the propulsion pod housing through an aperture in the strut; and an elastomeric bushing surrounding at least a portion of the fastener, the elastomeric bushing in contact with at least one of the strut or a retaining component rigidly coupled to the strut to provide vibration isolation between the propulsion pod and the strut.

The propulsion pod housing may include a first strut aperture and a second strut aperture extending therethrough, the first and second strut apertures dimensioned to allow sections of the strut to extend therethrough and prevent direct contact between a rigid portion of the strut and a rigid portion of the propulsion pod housing. The propulsion pod housing may include a gasket disposed within one of the first or second strut apertures in the propulsion pod housing to reduce hydrodynamic drag on the propulsion pod housing, the gasket including an elastomeric material. The propulsion pod housing may include a hydrodynamic deflector located fore of at least one of the first or second strut apertures in the propulsion pod housing to reduce hydrodynamic drag on the propulsion pod housing.

The vibration reduction mechanism may include a motor controller operably connected to the motor and configured to provide a nonlinear transition profile during changes in motor speeds, the nonlinear transition profile minimizing motor operation at speeds which generate forcing frequencies corresponding to resonant frequencies of components of the watercraft device.

In another broad aspect, an anisotropically flexible coupling mechanism is provided, the anisotropically flexible coupling mechanism configured to flexibly couple a suspended component to a support member extending therethrough, the coupling mechanism including a plurality of vibration isolating suspension mounts configured to extend through apertures in the support member, each of the vibration isolating suspension mounts including a rigid internal member extending along a longitudinal axis; and an elastomeric sheath surrounding the axially extending member, the elastomeric sheath including a radially inward portion surrounding the rigid internal member; and a radially outward portion spaced at least partially apart from the radially inward portion, the radially outward portion including an abutment surface configured to contact at least one of the support member or a component rigidly coupled to the support member.

The abutment surface of the elastomeric sheath may be generally orthogonal to the longitudinal axis of the rigid internal member. The apertures in the support member may be generally parallel to one another and axially offset from one another. The rigid internal member may be configured to be rigidly coupled to the suspended component at two locations on opposite sides of the support member.

In another broad aspect, a watercraft is provided, including a support platform configured to support at least one passenger; a propulsion mechanism; and a vibration isolating mount flexibly coupling the propulsion mechanism to the support platform, the vibration isolating mount configured to prevent direct contact between a component rigidly coupled to the support platform and a component rigidly coupled to the propulsion mechanism to inhibit direct translation of vibration from the propulsion mechanism to the support platform.

The vibration isolating mount includes an elastomeric structure configured to prevent direct contact between a component rigidly coupled to the support platform and a component rigidly coupled to the propulsion mechanism. The elastomeric structure may include an elastomeric sheath.

An inner surface of the elastomeric sheath may be in contact with a portion of the propulsion mechanism or a component rigidly coupled, either directly or indirectly, to the propulsion mechanism, and where an outer surface of the elastomeric sheath may be in contact with a portion of the support platform or a component rigidly coupled, either directly or indirectly, to the support platform. The portion of the propulsion mechanism or the component rigidly coupled to the propulsion mechanism may extend through an aperture in a portion of the support platform or the component rigidly coupled to the support platform.

An inner surface of the elastomeric sheath may be in contact with a portion of the support platform or a component rigidly coupled, either directly or indirectly, to the support platform, and where an outer surface of the elastomeric sheath may be in contact with a portion of the propulsion mechanism or a component rigidly coupled, either directly or indirectly, to the propulsion mechanism. The portion of the support platform or the component rigidly coupled to the support platform may extend through an aperture in a portion of the propulsion mechanism or the component rigidly coupled to the propulsion mechanism.

The watercraft may include a personal watercraft configured to support a single operator. The watercraft may include a jetski. The watercraft may include a watercraft configured to carry a plurality of passengers. The watercraft may include a boat. The component rigidly coupled to the support platform may include a transom of the boat.

The support platform may include a closed hull of the watercraft. The support platform may include an open hull of the watercraft.

The propulsion mechanism may include an outboard motor. The propulsion mechanism may include a propeller. The propulsion mechanism may include an electric motor. The propulsion mechanism may include an internal combustion engine.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise.

FIG. 1D is a top plan view of the hydrofoil watercraft of FIG. 1A. FIG. 1E is a bottom plan view of the hydrofoil watercraft of FIG. 1A.

FIG. 4A is an exploded isometric view of a strut with an adaptive clamp shown.

FIG. 8A is an exploded isometric view of another embodiment of a propulsion assembly in which a propulsion pod is secured to a housing via a plurality of vibrationally-isolated through pins.

DETAILED DESCRIPTION

Examples of weight-shift controlled watercraft are described in, for example, U.S. Pat. No. 10,797,118, which hereby incorporated by reference in its entirety.

Figure 1A:
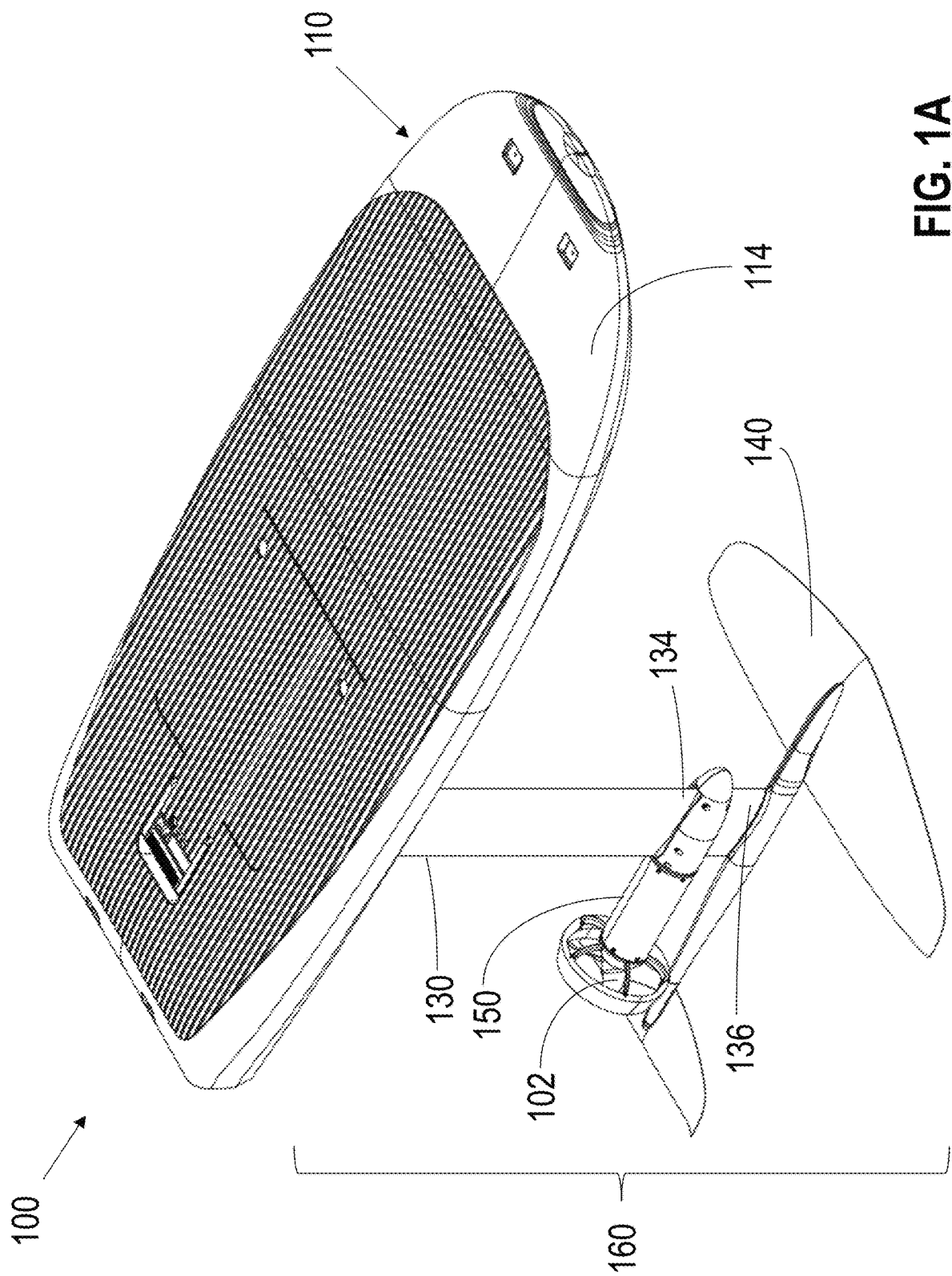
FIG. 1A is a perspective view of an assembled weight-shift controlled hydrofoil watercraft.
Figure 1B:
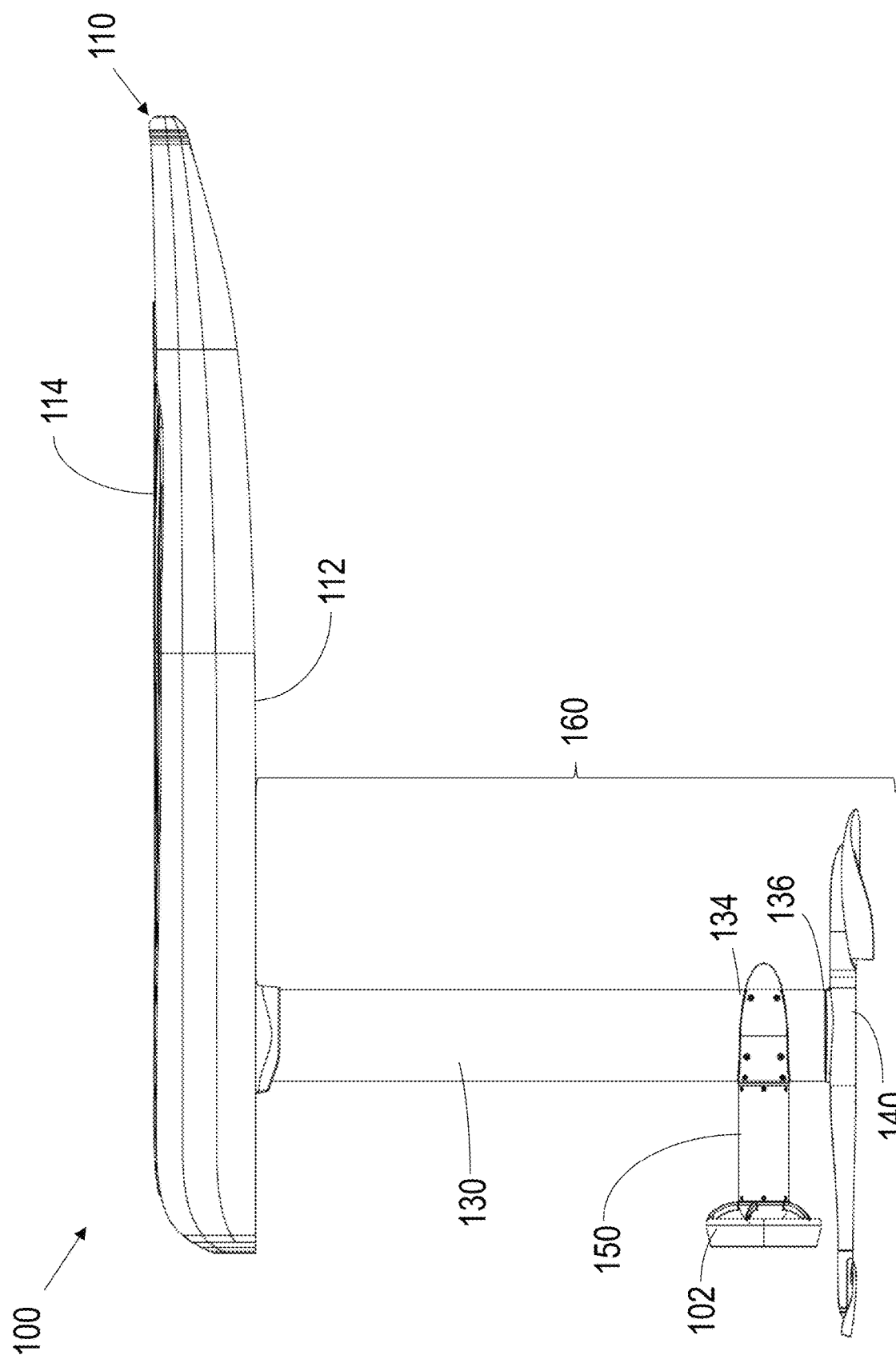
FIG. 1B is a side view of the hydrofoil watercraft of FIG. 1A.
Figure 1C:
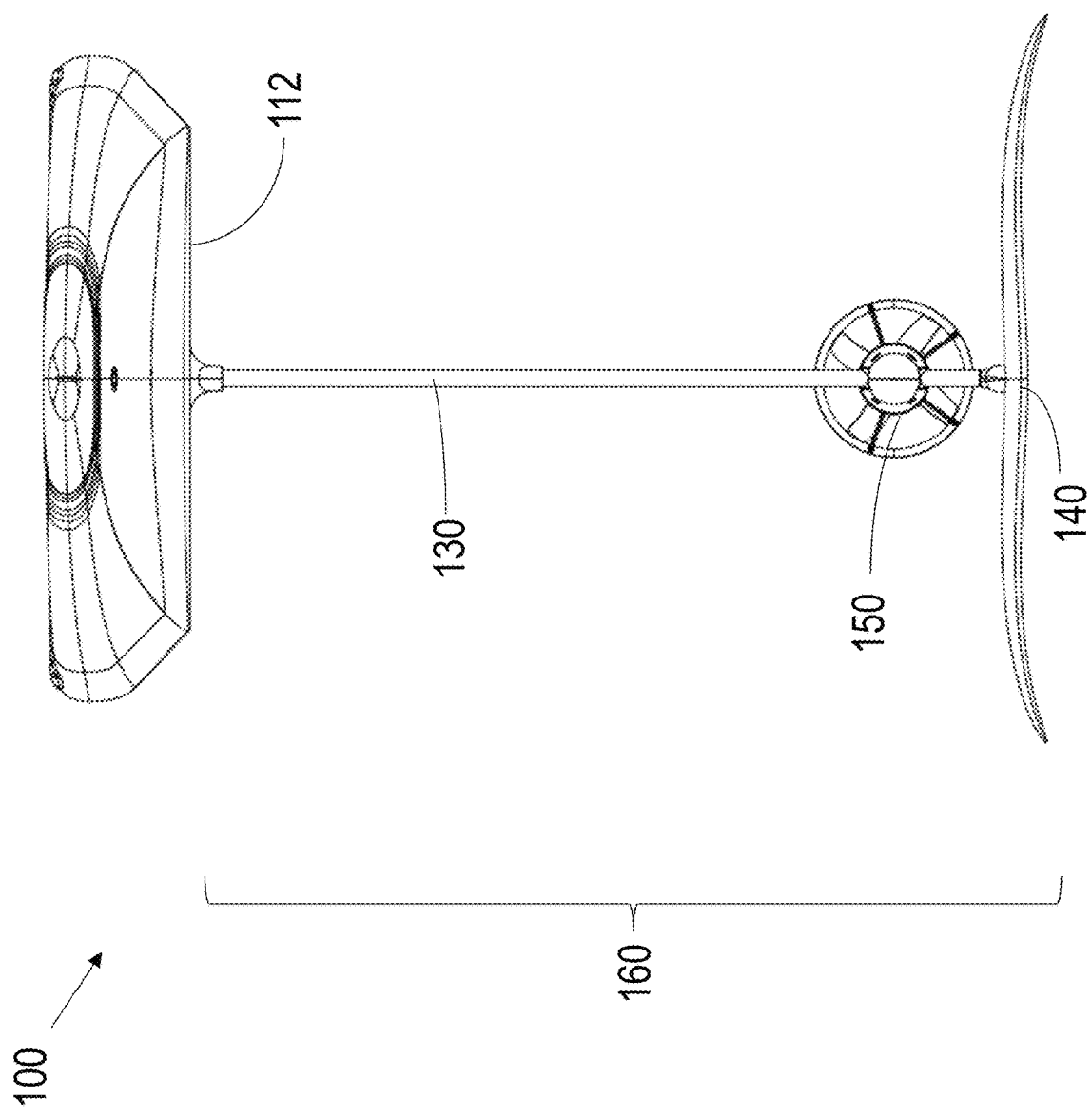
FIG. 1C is a front view of the hydrofoil watercraft of FIG. 1A.

FIG. 1A is a perspective view of an assembled weight-shift controlled hydrofoil watercraft. FIG. 1B is a side view of the hydrofoil watercraft of FIG. 1A. FIG. 1C is a front view of the hydrofoil watercraft of FIG. 1A. The hydrofoil watercraft 100 includes a board 110 for supporting a rider. The hydrofoil watercraft 100 also includes a strut 130 extending away from a lower surface 112 of the board 110. In the illustrated embodiment, the strut 130 supports a hydrofoil 140 coupled to the strut 130 at a hydrofoil coupling point 136, and a propulsion pod 150 coupled to the strut 130 at a propulsion pod coupling point 134. The strut 130, along with the hydrofoil 140 and propulsion pod 150 supported by the strut 130, form a propulsion assembly 160. In the illustrated embodiment, the hydrofoil coupling point 136 is located at or near the base of the strut 130 and the propulsion pod coupling point 134 is located between the board and the hydrofoil coupling point 136.

As discussed in greater detail elsewhere herein, the couplings between the strut 130 and the hydrofoil 140 and the propulsion pod 150 may be made in any suitable manner. In some embodiments, the hydrofoil 140 and/or the propulsion pod 150 may be partially or wholly integral with the strut. In some embodiments, intermediate coupling structures may be used to facilitate a desired coupling arrangement between the hydrofoil 140 and/or the propulsion pod 150 and the strut 130. In some embodiments, the hydrofoil 140 may be integral with the propulsion pod 150, such that the wings of the hydrofoil extend from the propulsion pod 150 itself, rather than being part of a discrete structure.

Many embodiments of hydrofoil watercrafts include a rigid coupling between the propulsion system and the strut, and similarly rigid couplings between strut and board. In a weight-shift controlled system, such a rigid coupling may be intended to provide stability and tighter control over the operation of the hydrofoil watercraft and improve the performance of the watercraft. A rigid coupling may be expected to provide more responsiveness to a rider during operation.

FIG. 1A also illustrates principal axes of the hydrofoil watercraft 100, shown relative to the propulsion pod 150. The roll axis of the hydrofoil watercraft 100 is illustrated as aligned with the longitudinal axis of the propulsion pod 150 and in particular with the axis of rotation of the propeller 102. The pitch axis of the hydrofoil watercraft 100 is perpendicular to the roll axis. The yaw axis of the hydrofoil watercraft 100 is coplanar with the roll axis of the hydrofoil watercraft 100 and with the longitudinal axis of the strut 130. However, the yaw axis of the hydrofoil watercraft 100 may in some embodiments be oriented at an angle to the longitudinal axis of the strut, depending on the design of the strut 130 and the hydrofoil 140. For example, in other embodiments, a longitudinal axis of the strut 130 is oriented at an oblique angle to the longitudinal axis of the propulsion pod 150, rather than a right angle. In such an arrangement, there may be a non-zero angle between the longitudinal axis of the strut 130 and the yaw axis of the hydrofoil watercraft 100.

The hydrofoil 140 will generate lift as the hydrofoil watercraft 100 moves through the water. Depending on the amount of lift generated by the hydrofoil 140, the hydrofoil watercraft 100 can operate in a non-foiling mode, a planing mode, or a foiling mode. In the non-foiling mode, the board 110 is in contact with the surface of the water, and the buoyancy of the board 110 supports the hydrofoil watercraft 100 and the rider. In the planning mode, any lift generated by the hydrofoil 140 is insufficient to overcome the weight of the hydrofoil watercraft 100, and the board 110 may remain generally in contact with the water as the hydrofoil watercraft 100 moves through the water. When operating in foiling mode, the lift generated by the hydrofoil 140 is sufficient to lift the board 110 away from the surface of the water and support the weight of the hydrofoil watercraft 100 and rider. As described in U.S. Pat. No. 10,797,118, the hydrofoil watercraft 100 may be designed to provide a smooth transition between these different modes of operation.

In contrast to watercraft driven by internal combustion engines such as outboard motors, which may generate a substantial amount of noise, a hydrofoil watercraft may be driven by a comparatively quieter electric motor. However, the various components of a hydrofoil watercraft driven by an electric motor, such as the motor itself, the driven propeller, the gearbox, and other components of the hydrofoil watercraft, will still generate noise. Certain frequencies of noise and vibration generated by the components of the hydrofoil watercraft may be propagated via the strut 130 to which the propulsion pod 150 is rigidly coupled, and may subsequently be amplified by the surrounding board 110.

The operation of the hydrofoil watercraft may result in the generation of noise within the range of human hearing, and the transmitted vibrations may also be felt by the rider. As human hearing is particularly sensitive to sounds with frequencies between 300 Hz and 3 kHz, a hydrofoil watercraft which reduces the volume of generated noise in the range of 300 Hz and 3 kHz, and which minimizes vibrations, may provide a more pleasant operating experience. This reduction in audible noise and vibration could allow, for example, conversations between two hydrofoil watercraft riders riding near each other, even when operating in foiling mode.

In some embodiments of hydrofoil watercrafts, one or more vibration isolating components may be provided between the propulsion system and the board to minimize noise generation and vibration transmission. As noted above, in some embodiments, a coupling between the propulsion pod 150 and the strut 130 may be substantially rigid, such as by bolting the propulsion pod 150 directly to the strut 130, or by forming the strut and propulsion pod housing as an integral structure. This rigid coupling allows for minimal movement of the strut 130 relative to the propulsion pod 150 other than deformation of the structural elements themselves. In such an embodiment, vibrations generated by operation of the propulsion pod 150 may be transmitted directly to the strut 130, and from there to the board 110 and a rider seated thereon. The transmissions may occur along a number of connected paths, including direct connections between the strut 150 and the board 100, and indirect connections between the strut 150 and the board 110 through intermediate components.

Figure 2A:
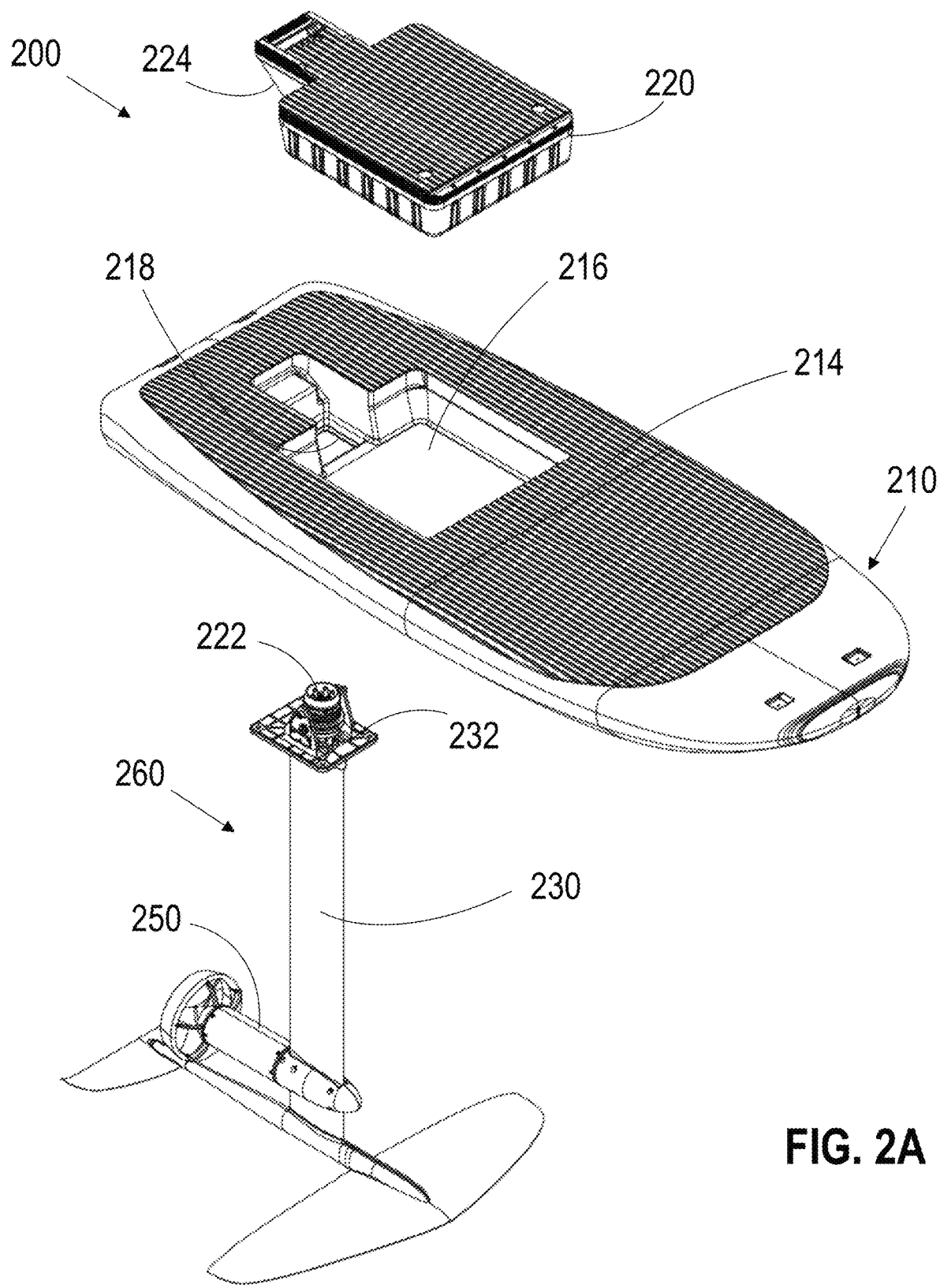
FIG. 2A is a partially exploded perspective view of a hydrofoil watercraft such as the hydrofoil watercraft of FIG. 1A, illustrating a modular design of certain components of the hydrofoil watercraft.
Figure 2B:
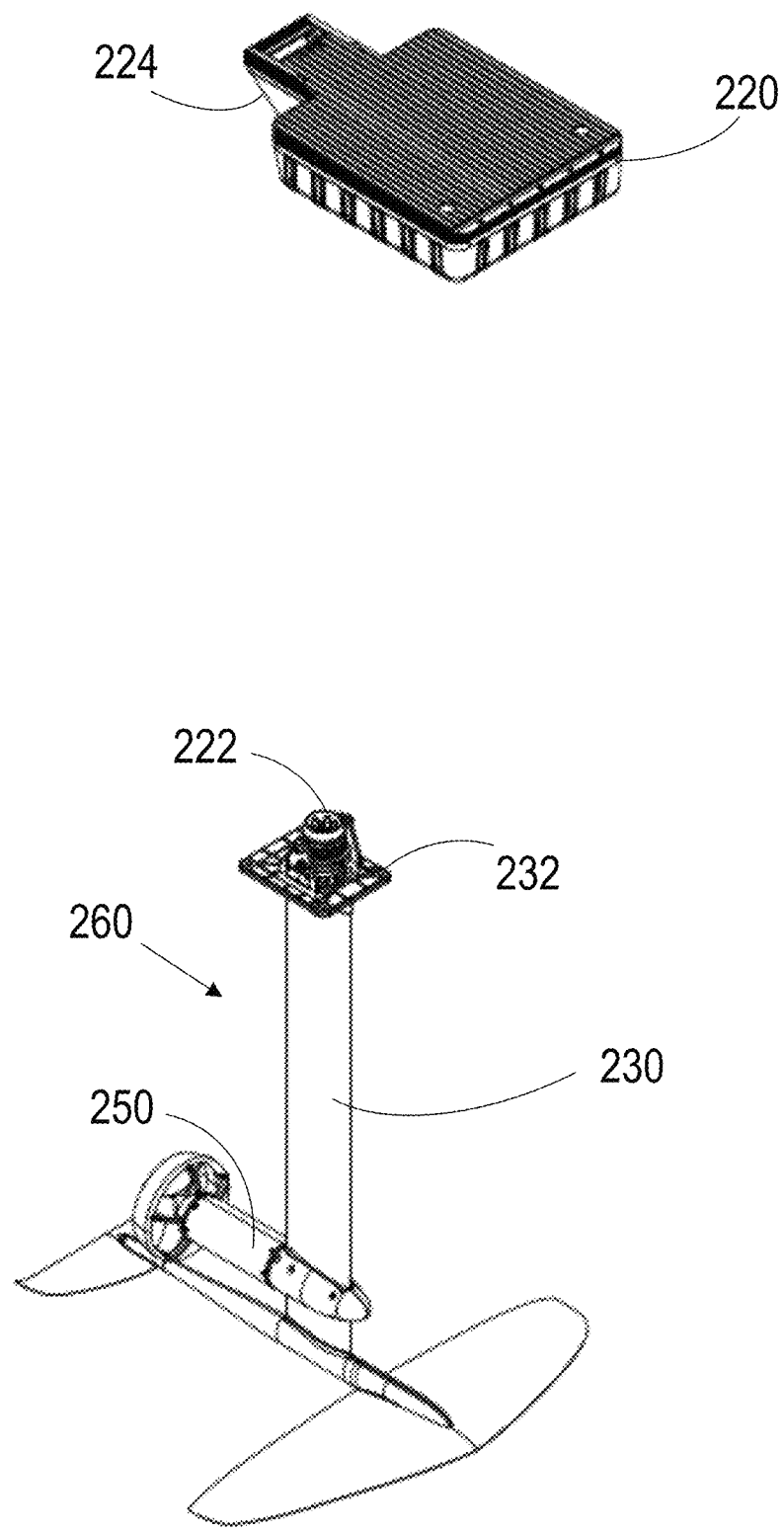
FIG. 2B is a perspective view of the propulsion assembly and battery pack of the hydrofoil watercraft of FIG. 2A, shown in a detached state.
Figure 2C:
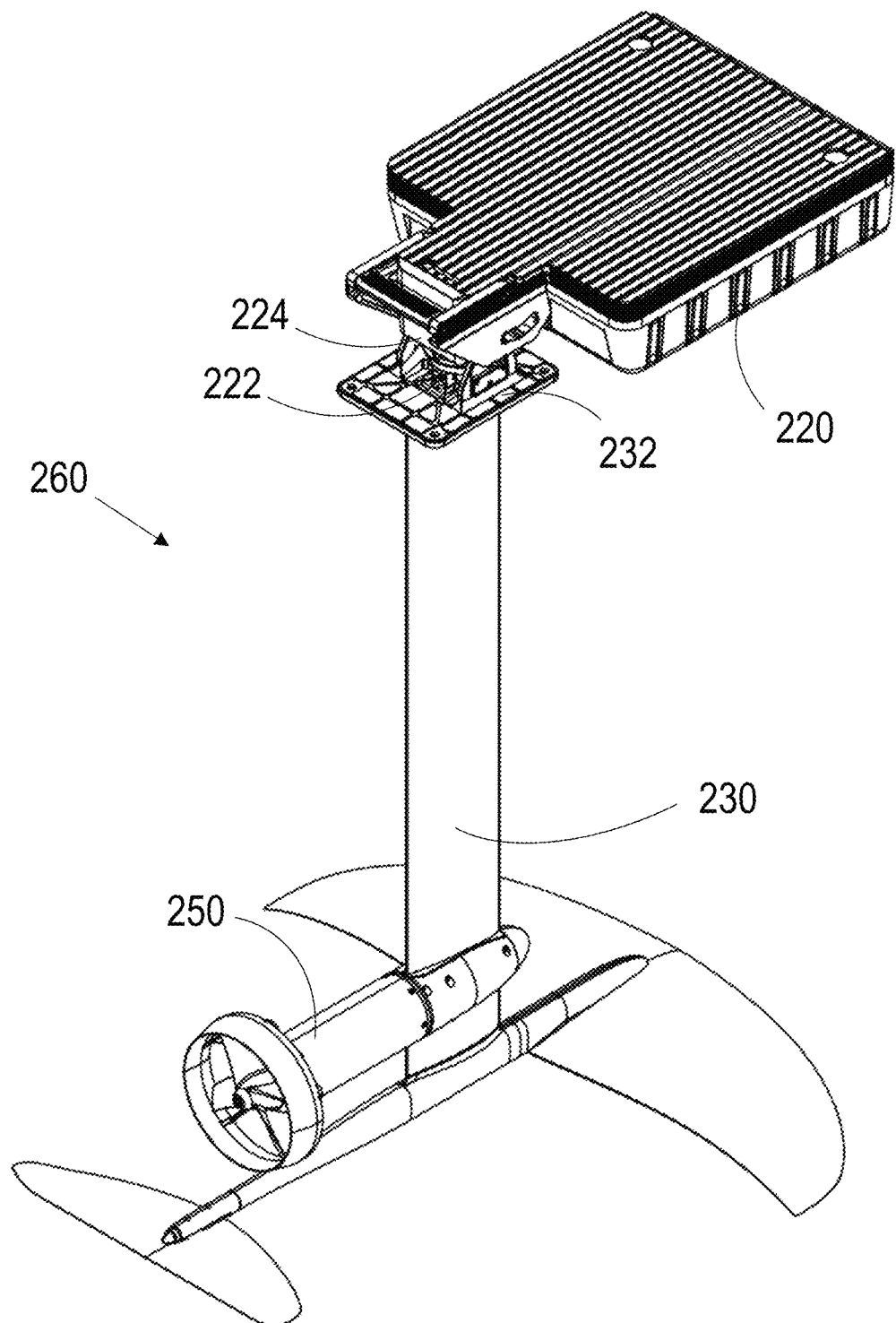
FIG. 2C is a perspective view of the propulsion assembly and battery pack of the hydrofoil watercraft of FIG. 2A, shown in an assembled state.
Figure 2D:
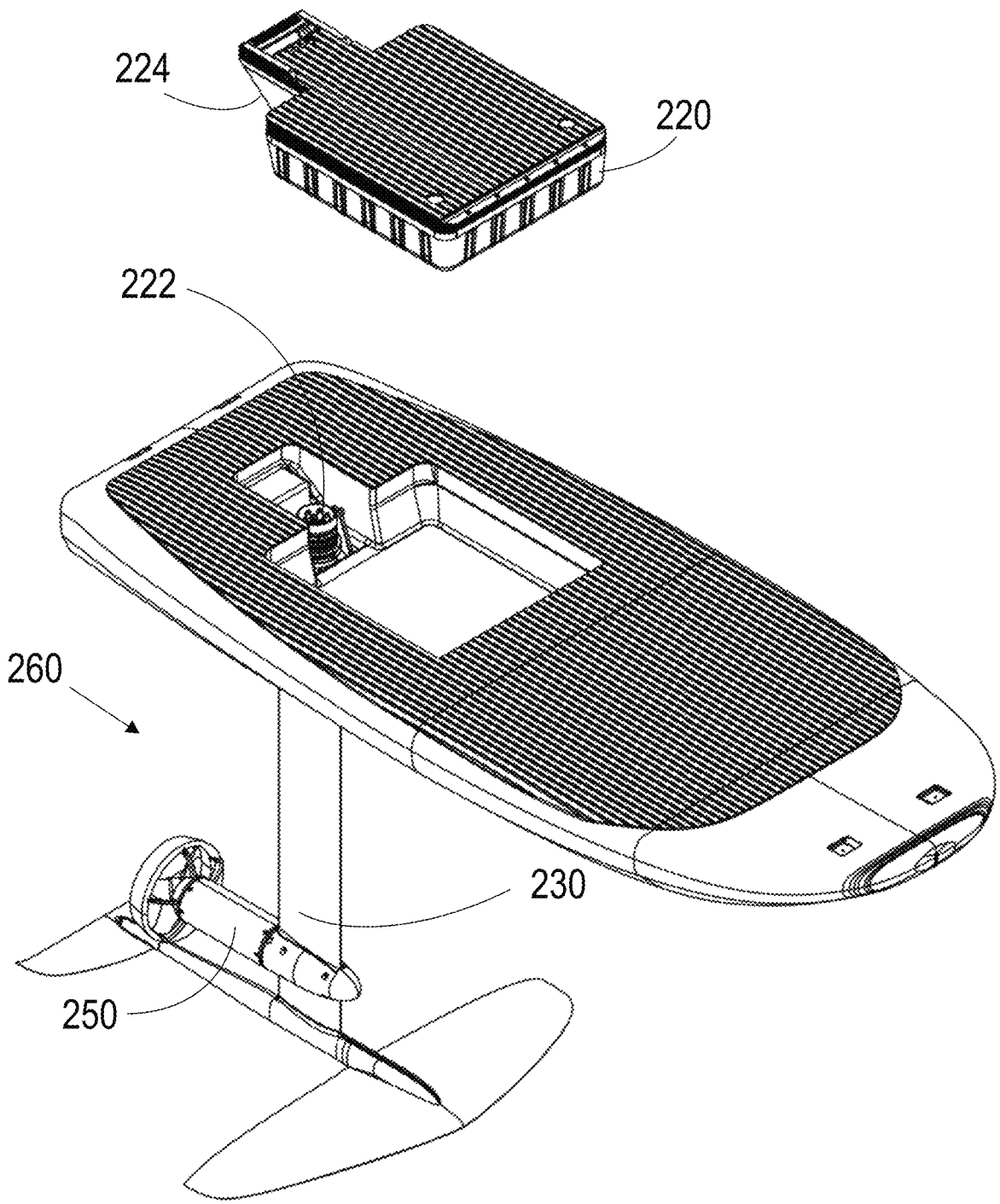
FIG. 2D is a perspective of the hydrofoil watercraft of FIG. 2A, shown in a partially assembled state in which the propulsion assembly is attached to the board.

FIG. 2A is a partially exploded perspective view of a hydrofoil watercraft such as the hydrofoil watercraft of FIG. 1A, illustrating a modular design of certain components of the hydrofoil watercraft. FIG. 2B is a perspective view of the propulsion assembly and battery pack of the hydrofoil watercraft of FIG. 2A, shown in a detached state. FIG. 2C is a perspective view of the propulsion assembly and battery pack of the hydrofoil watercraft of FIG. 2A, shown in an assembled state.

In some embodiments, a power source for the hydrofoil watercraft 200 may be disposed within a discrete component which is separable from the board 210. In the illustrated embodiment, the hydrofoil watercraft 200 includes a battery pack 220 dimensioned to be retained within a recess 216 within the board 210. Although referred to as a battery pack 220, the battery pack 220 may include any other suitable components in addition to battery cells or other components capable of storing power, including control circuitry, sensors, transceivers, memory, or other components. The battery pack 220 may therefore be a discrete component which can be detached from the propulsion assembly 260 which includes the strut 230 and the other components, such as propulsion pod 250.

The battery pack 220 can have an upper surface which is generally coplanar with the upper surface 214 of the board 210, such that the battery pack 220 cooperates with the surrounding portion of the board 210 to form a surface upon which a rider can stand. In the illustrated embodiment, the recess includes at least one aperture extending to the lower surface of the board and allowing the strut 230 to be attached to the battery pack 220 therethrough.

In some embodiments, the upper end of strut 230 may include a plug component 222 configured to be placed in a mating configuration with a plug component 224 on a lower surface of the battery pack 220. In the illustrated embodiment, the plug component 222 of the strut 230 comprises a plug, and the plug component 222 of the battery pack 220 includes a corresponding receptacle, although in other embodiments, the relative locations of the plug and receptacle may be reversed.

In some embodiments, the upper end of strut 230 may include a mounting plate 232 supporting the plug component 222 and extending radially outward beyond the edges of the plug component. The mounting plate may be brought into contact with a mounting surface of the board 210, such as the recessed mounting surface 218 of the board 210, and secured in place by a plurality of rigid fasteners. Once the strut 230 is secured to the board 210, the battery pack 220 may be seated within the recess 216 of the board 210, and the two plug components 222 and 224 may be connected to connect the battery pack 220 to the propulsion assembly 260.

Although the electric motor of propulsion pod 250 may be quieter than internal combustion engines used by other watercraft, the operation of the propulsion pod 250 will nevertheless generate noise and vibration. The vibration generated by the propulsion pod 250 will be conducted from the propulsion pod 250 to the strut 230. The vibration will then be conducted directly to the board 210 via the rigid connection between the mounting plate 232 of the strut 230 and the mounting surface 218 of the board 210. In addition, because the wiring connecting the propulsion pod 250 to the battery pack 220 may be thick, vibrations will also be transmitted from the propulsion assembly 260 to the battery pack 220 via the plug connection, and from the battery pack 220 to the surrounding board 210.

The modular design of the hydrofoil watercraft 200 will affect the propagation of vibrations within the components of the hydrofoil watercraft 200. In particular, because the battery pack 220 may be substantially denser than the surrounding board 210, the large mass and density of the battery pack 220 may reflect vibrations transmitted up the strut 230 back down the strut 230. By concentrating much of the weight of the board 210 in a discrete, central structure adjacent the strut 230, the overall amount of vibration transmitted to the surrounding board 210 is reduced.

However, additional components can be used to reduce vibration transmission at each of these attachment points. For example, while high-gauge wiring used to transmit power from the battery pack 220 to the propulsion pod 250 will conduct vibration, the use of an elastomeric material in the mating components of one or both of the plug components 222 and 224 can reduce the amount of vibration transmission from the strut 230 to the battery pack 220. In addition, the use of an elastomeric material can also facilitate the formation of a watertight seal between the two plug components 222 and 224.

Figure 3A:
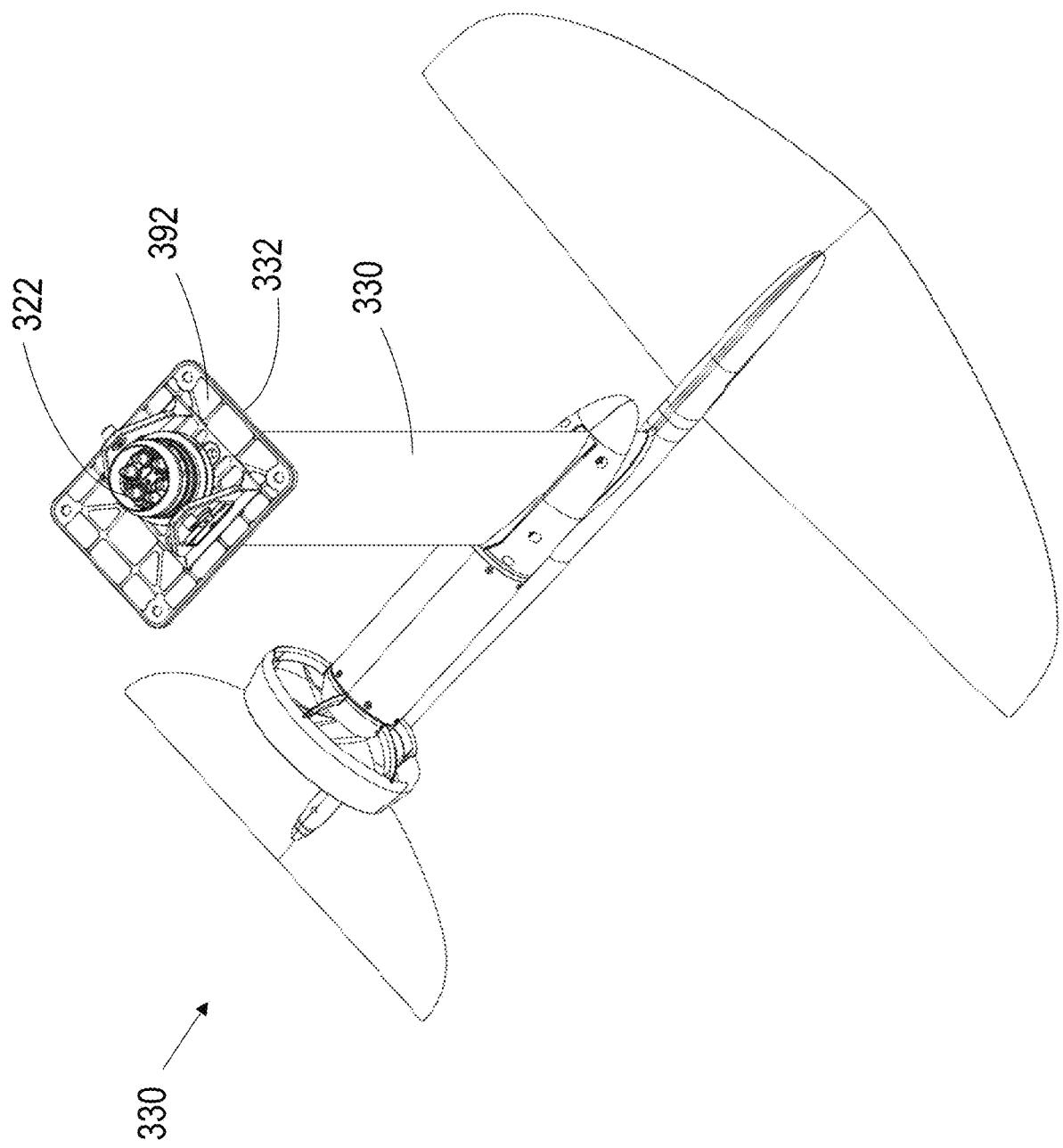
FIG. 3A is a perspective view of another embodiment of a propulsion assembly which includes an elastomeric vibration isolating component.

FIG. 3A is a perspective view of another embodiment of a propulsion assembly which includes an elastomeric vibration isolating component. In particular, the propulsion assembly 360 is similar to the propulsion assembly 260 of FIG. 2A but differs in that the mounting plate 332 of the strut 330 includes an elastomeric sheet 392 surrounding the plug component 322. When the strut 330 is attached to the board, the elastomeric sheet 392 will be retained between the mounting plate 332 and the corresponding mounting surface of the board, preventing direct contact between the mounting plate 332 and the mounting surface of the board. By forcing the vibration to be transmitted through the elastomeric sheet 392 and through the comparatively smaller rigid fasteners securing the propulsion assembly 360 to the board, the amount of vibration transmitted from the strut 330 to the board will be reduced.

In the illustrated embodiment, the elastomeric sheet 392 is a single contiguous structure, but may include contours, cutouts, or other features not specifically illustrated. In other embodiments, however, a plurality of elastomeric structures may be used in place of a single elastomeric sheet 392. In other embodiments, the elastomeric sheet may be positioned on the mounting surface of the board, rather than the mounting plate 332 of the strut 330.

Figure 3B:
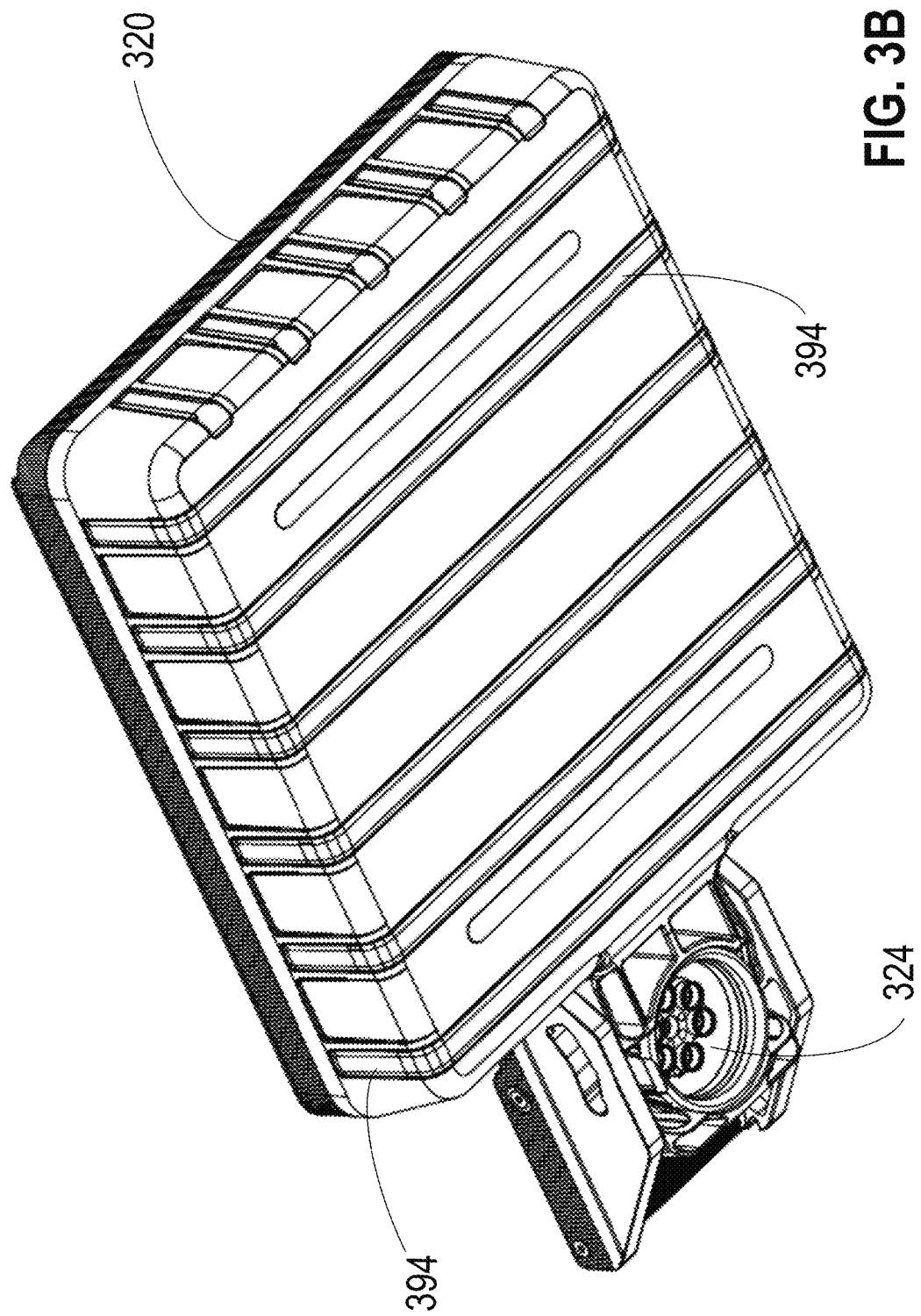
FIG. 3B is a perspective view of another embodiment of a battery pack which includes an elastomeric vibration isolating component.

FIG. 3B is a perspective view of another embodiment of a battery pack which includes an elastomeric vibration isolating component. In particular, the battery pack 320 is similar to the battery pack 220 of FIG. 2A but differs in that the battery pack 320 includes one or more elastomeric sections 394 configured to contact an interior surface of the corresponding recess in the board. In the illustrated embodiment, the battery pack 320 includes elastomeric sections 394 on each of the side surfaces of the battery pack 320, as well as the lower surface of the battery pack 320, so that any portion of the battery pack 320 which is in contact with the walls or base of the recess in the board has a portion of an elastomeric section 394 between the battery pack 320 and the adjacent inner surface of the recess.

By including elastomeric vibration isolating components in some or all of the connection points between the strut and the board, between the strut and the battery pack, and between the battery pack and the board, the transmission of vibrations from the strut to the board can be reduced. However, in the absence of further vibration isolation, a rigid connection between the propulsion pod and the strut will result in vibrations being transmitted to the strut, and may be amplified by the board or other components of the hydrofoil watercraft if a forcing frequency is generated at a natural resonance of a component of the hydrofoil watercraft. In some embodiments, vibration isolating components can be included closer to the propulsion pod which is the source of the vibration. By including vibration isolating components closer to the source of the vibration, the provide vibration isolation can be more effective.

In some embodiments, an adapter structure may be used to form part of a coupling between a strut and a propulsion pod. Such an adapter structure may, for example, further define the shape of a channel extending through the strut to provide an aperture or channel having a wider cross-sectional dimension near the outer edges of the aperture or channel than near the center of the aperture or channel. Such an adapter structure may also be used to extend the length of an aperture or channel extending through the strut.

Figure 4B:
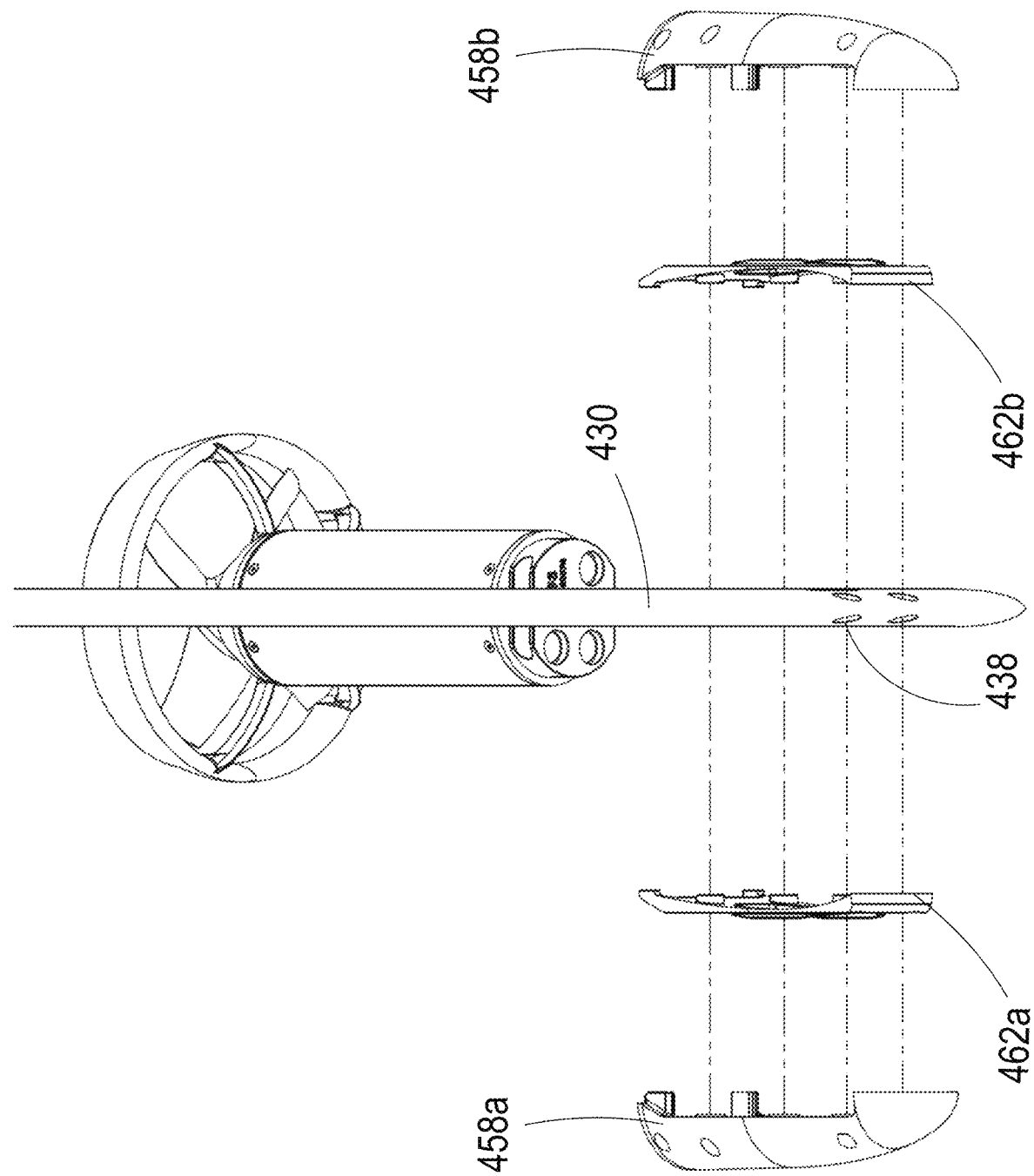
FIG. 4B is another exploded view of the strut and adaptive clamp of FIG. 4A.
Figure 4D:
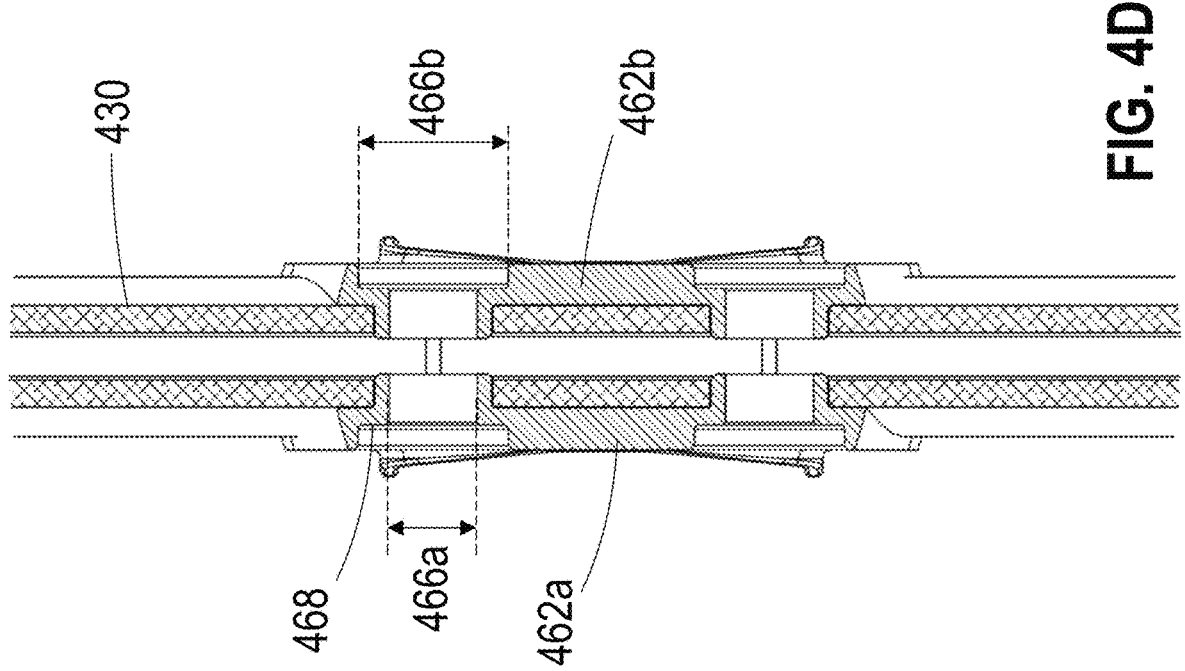
FIG. 4D is a cross-sectional view of the assembled strut and adaptive clamp of FIG. 4C.
Figure 4C:
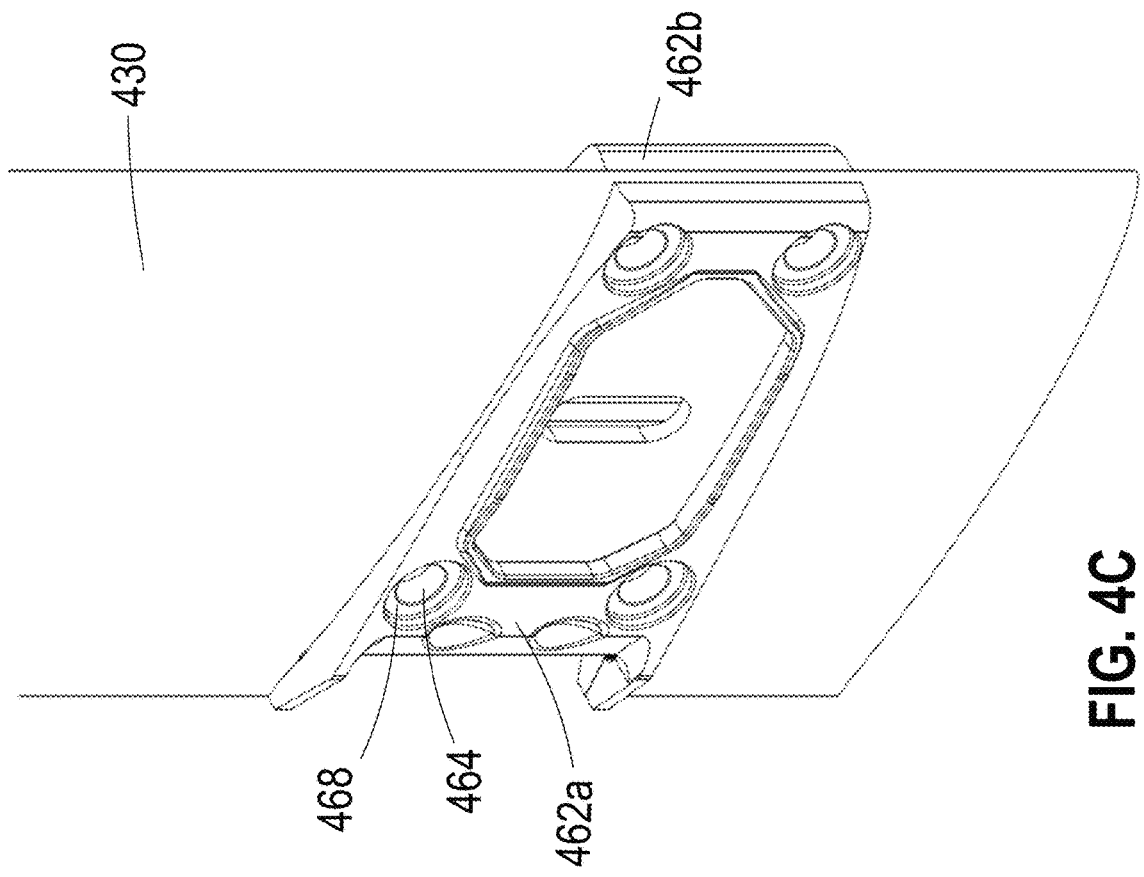
FIG. 4C is an assembled view of the strut and adaptive clamp of FIG. 4A.

FIG. 4A is an exploded isometric view of a strut with an adaptive clamp shown. FIG. 4B is another exploded view of the strut and adaptive clamp of FIG. 4A. FIG. 4C is an assembled view of the strut and adaptive clamp of FIG. 4A.

The strut 430 includes first and second adaptive clamp components 462a and 462b on either side of the strut 430. Each of the first and second adaptive clamp components 462a and 462b include a plurality of apertures 464 extending therethrough. The apertures 464 are configured to be aligned with corresponding apertures 438 extending through the strut 430.

In the illustrated embodiment, the apertures 464 in the first and second adaptive clamp components 462a and 462b have a first cross-sectional diameter 466a in an interior portion of the apertures 464 configured to be positioned adjacent the strut 430, and a second, larger, cross-sectional diameter 466b in an exterior portion of the apertures 464 further from the strut 430. The transition between the first cross-sectional diameter 466a and the second cross-sectional diameter 466b can be abrupt, such that the apertures 464 include an internal abutment surface 468 which may be generally parallel to the surface of the strut 430. As discussed in greater detail below, the internal abutment surface 468 may be configured to contact a facing surface of an elastomeric bushing to provide a restoring force inhibiting rotation of the strut relative to a propulsion pod coupled thereto. Each aperture 464 provides an internal abutment surface 468 on either side of the strut 430.

In other embodiments, however, as discussed in greater detail elsewhere herein, apertures may be formed directly in the strut itself, and may in some particular embodiments have multiple cross-sectional diameters. In some particular embodiments, the apertures with multiple cross-sectional diameters may be more easily formed when the strut is formed at least partially using a molding or casting process, rather than when an extrusion process is used to form a strut.

In embodiments in which the propulsion pod is directly and rigidly coupled to the strut, one or more bolts or screws extending through the propulsion pod and the strut may be used to couple the strut to the propulsion pod. In such embodiments, a bolt head and nut may be positioned on opposite sides of the strut, and the nut tightened on the bolt to retain the propulsion pod in a rigidly coupled relationship relative to the strut. In other such embodiments, a screw may engage internal threading of one or both of the strut and/or propulsion pod housing to rigidly couple the strut relative to the propulsion pod housing. In these embodiments, apertures having a substantially constant cross-section may extend through the strut and propulsion pod and be aligned with one another to receive a bolt or screw, and the use of adaptive clamp components such as first and second adaptive clamp components 462a and 462b may be unnecessary, as there may be no need to define apertures having a varying cross-sectional shape. However, the use of adaptive clamp components can facilitate the use of alternative coupling mechanisms discussed in greater detail herein.

In some embodiments, an elastomeric vibration isolating component may be disposed between the propulsion pod and the strut. By disposing the elastomeric vibration isolating component between the propulsion pod and the strut, the vibration isolating component can inhibit vibrations from being transmitted to the strut, rather than inhibiting the transmission of vibrations from the strut to the board and other intermediate components.

In some particular embodiments, vibration isolation structures can be disposed between the propulsion pod and the strut, forming a flexible coupling between the propulsion pod and the strut. In particular, vibration isolation structures may be used to provide an anisotropically flexible coupling between the propulsion pod and the strut. Such a vibration isolation structure can be used to control the degree of flexibility in various directions. The vibration isolation structures can provide a significant amount of vibration isolation in comparison to a rigid coupling. Such vibration isolating structures can be configured to have a minimal effect on the responsiveness of the hydrofoil watercraft to weight-shifted control of the hydrofoil watercraft.

In some embodiments, an anisotropically flexible coupling mechanism can include one or more elastomeric bushings configured to prevent direct contact between rigid portions of the propulsion pod and the strut. A plurality of such elastomeric bushings can be configured to define a desired anisotropically flexible coupling between the strut and the propulsion pod.

Figures 5A, 5B:
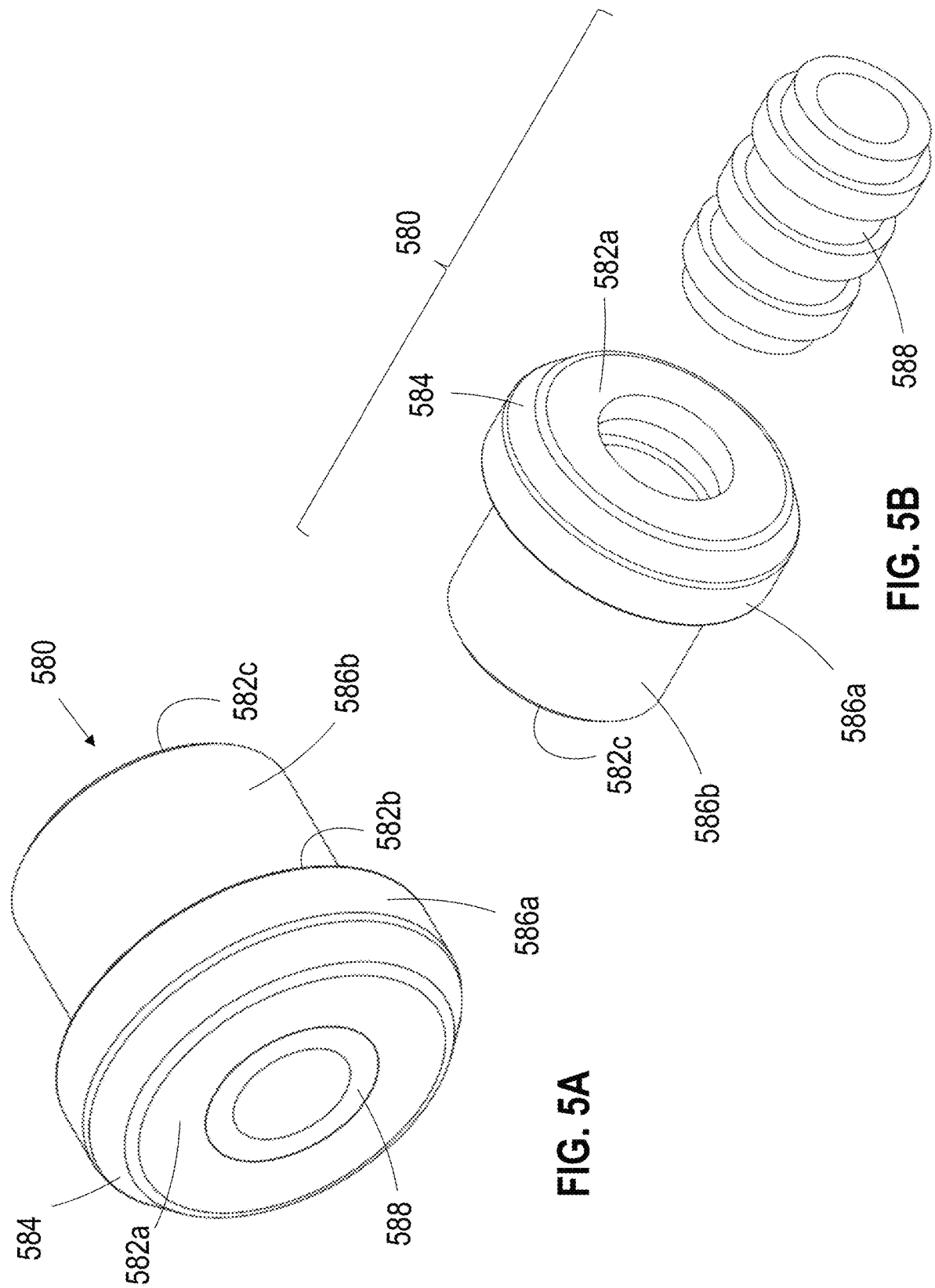
FIG. 5A is a perspective view of an embodiment of an elastomeric bushing which can be used as part of a flexible coupling between a propulsion pod and a strut.
FIG. 5B is an isometric exploded assembly view of the elastomeric bushing of FIG. 5A.
Figure 5D:
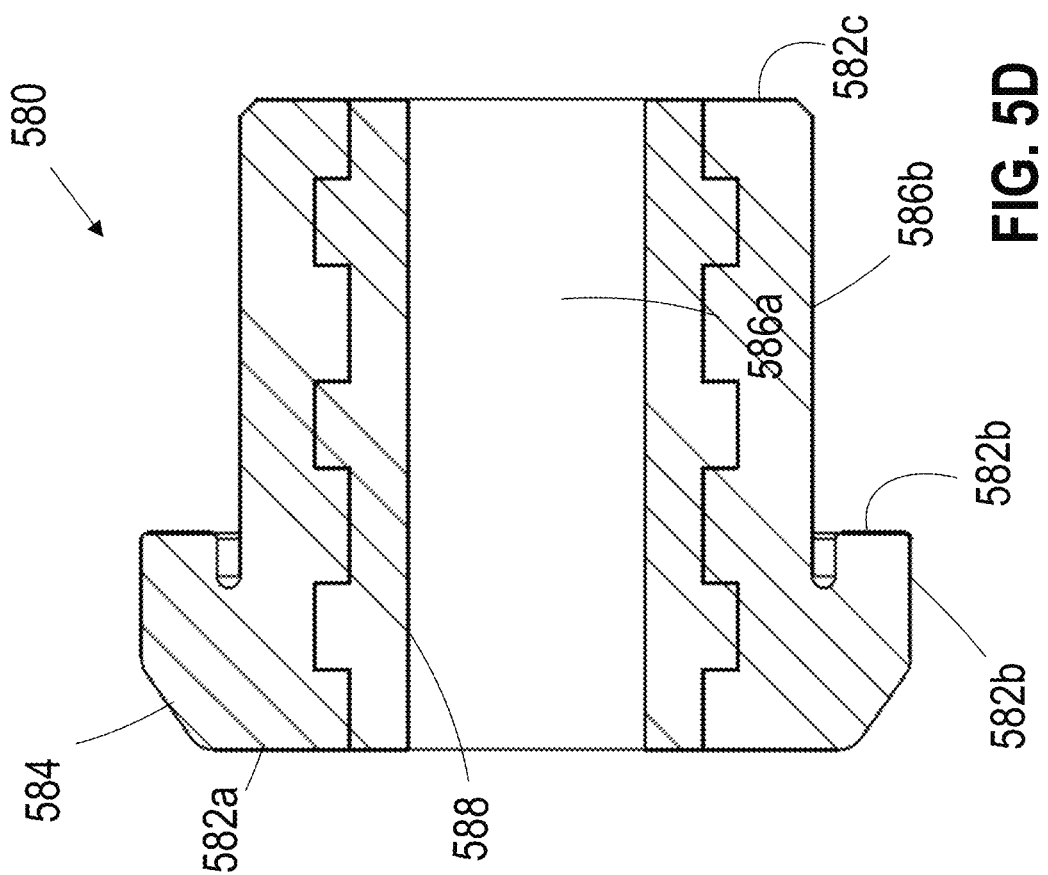
FIG. 5D is a cross-sectional view of the elastomeric bushing of FIG. 5A, taken along the line D-D of FIG. 5C.
Figure 5C:
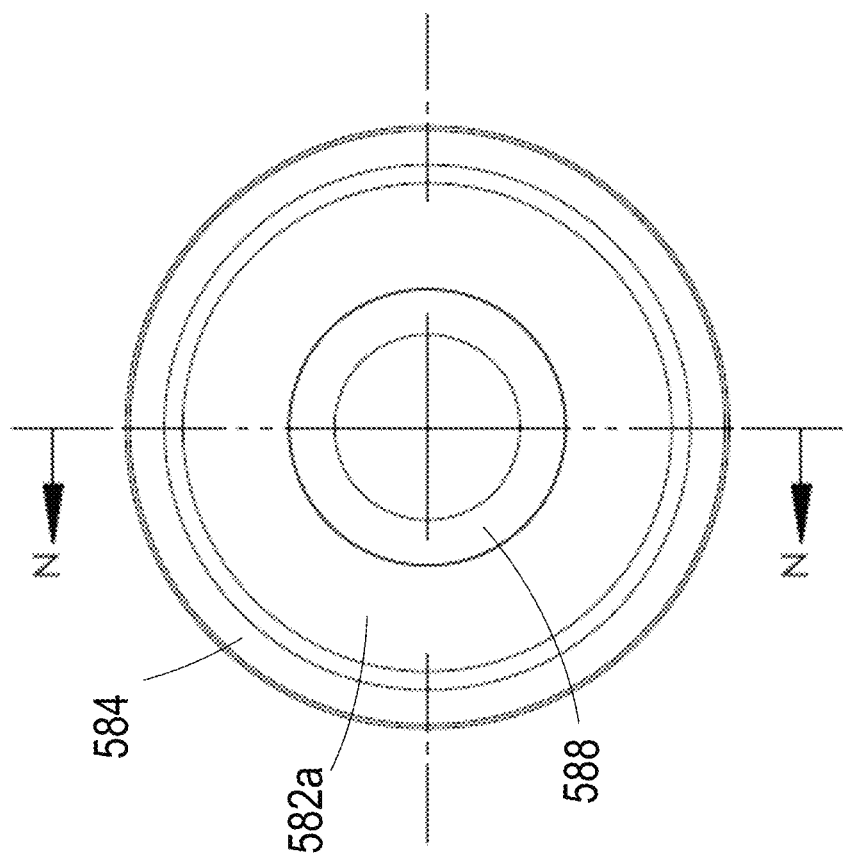
FIG. 5C is a front view of the elastomeric bushing of FIG. 5A.

FIG. 5A is a perspective view of an embodiment of an elastomeric bushing which can be used as part of a flexible coupling between a propulsion pod and a strut. FIG. 5B is an isometric exploded assembly view of the elastomeric bushing of FIG. 5A. FIG. 5C is a front view of the elastomeric bushing of FIG. 5A. FIG. 5D is a cross-sectional view of the elastomeric bushing of FIG. 5A, taken along the line D-D of FIG. 5C.

The elastomeric bushing 580 has an outer cross-sectional shape which includes a beveled shoulder 584 which tapers to an outer face 582a of the elastomeric bushing 580. The beveled shoulder 584 reduces the surface area of the outer face 582. Inward of the beveled shoulder 584, an outer sleeve portion 586a is partially separated from and overlaps with an inner sleeve portion 586b, the outer sleeve portion terminating in an inner abutment surface 582b. An overmolding process may be used to form the elastomeric bushing 580, joining discretely molded parts together. In other embodiments, however, any other suitable fabrication method may be used to form the elastomeric bushing.

The elastomeric bushing 580 may in some embodiments not be formed entirely of an elastomeric material. For example, in the illustrated embodiment, the inner sleeve portion 586b has an internal rigid sleeve 588 extending therethrough. The internal rigid sleeve may have a substantially constant inner diameter, and an outer diameter which includes outwardly extending features configured to engage corresponding features on the interior of the inner sleeve portion 586b, preventing slippage of the internal rigid sleeve 588 relative to the elastomeric components of the elastomeric bushing. In the illustrated embodiment, the internal rigid sleeve 588 extends the entire length of the elastomeric bushing 580, from the inner face 582c to the outer face 582a.

In some embodiments, a plurality of elastomeric bushings may be used to form a flexible coupling mechanism for coupling the propulsion pod to the strut. A pair of elastomeric bushings may be axially aligned with one another, with the outer faces of each bushing facing outwards on opposite side of the bushing arrangement. A through-pin may be inserted through the pair of axially aligned elastomeric bushings, with the through-pin extending through and contacting the rigid inner sleeves of the elastomeric bushings. The through-pin may be secured at each end relative to the housing of the propulsion pod. The interior faces of the elastomeric bushings may be in contact with one another to define a substantially contiguous cylindrical elastomeric structure extending through an aperture in the strut.

Figure 6A:
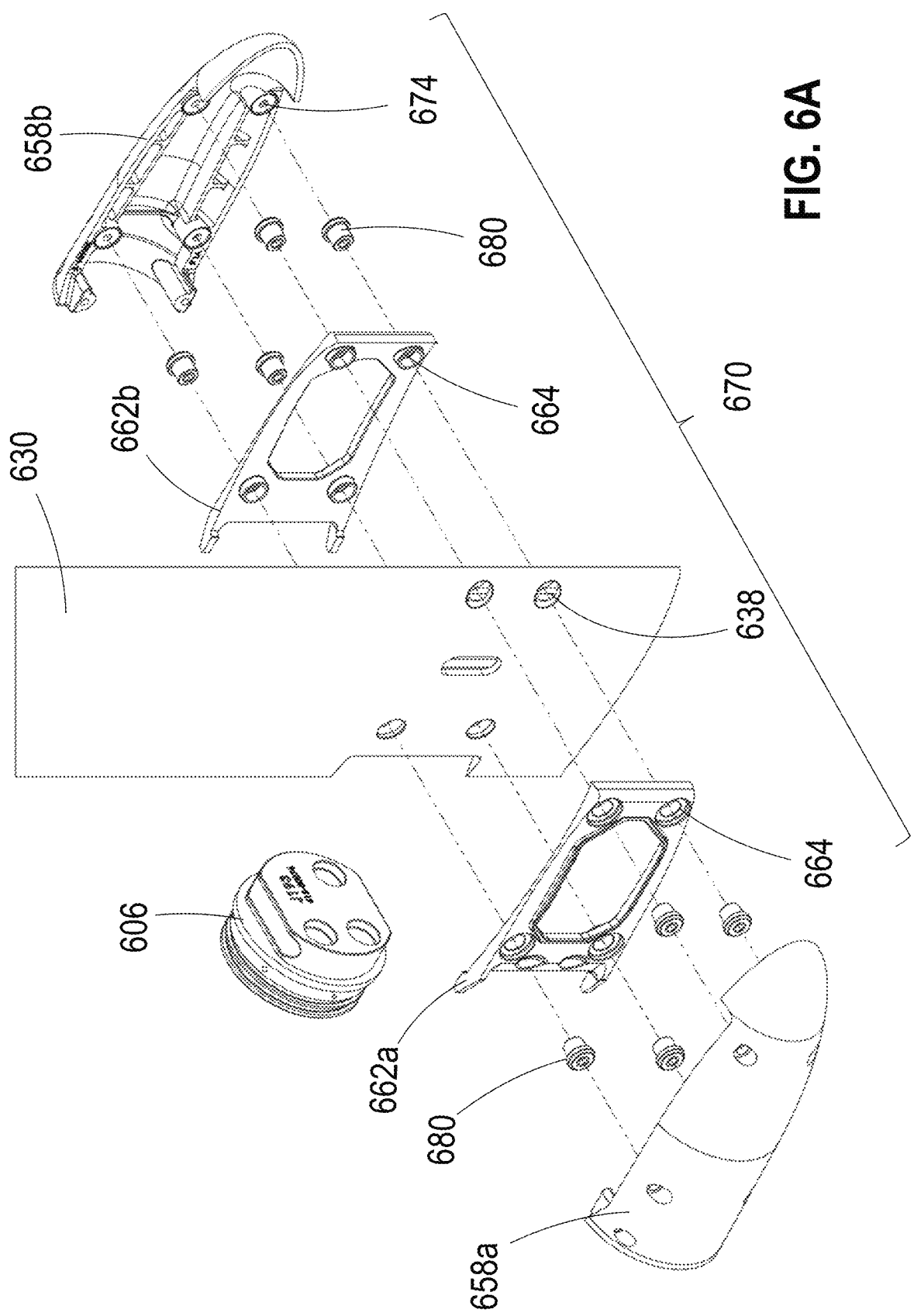
FIG. 6A is an exploded isometric view of an embodiment of a propulsion assembly in which a propulsion pod is secured to a housing via a plurality of vibrationally-isolated through-pins.
Figure 6B:
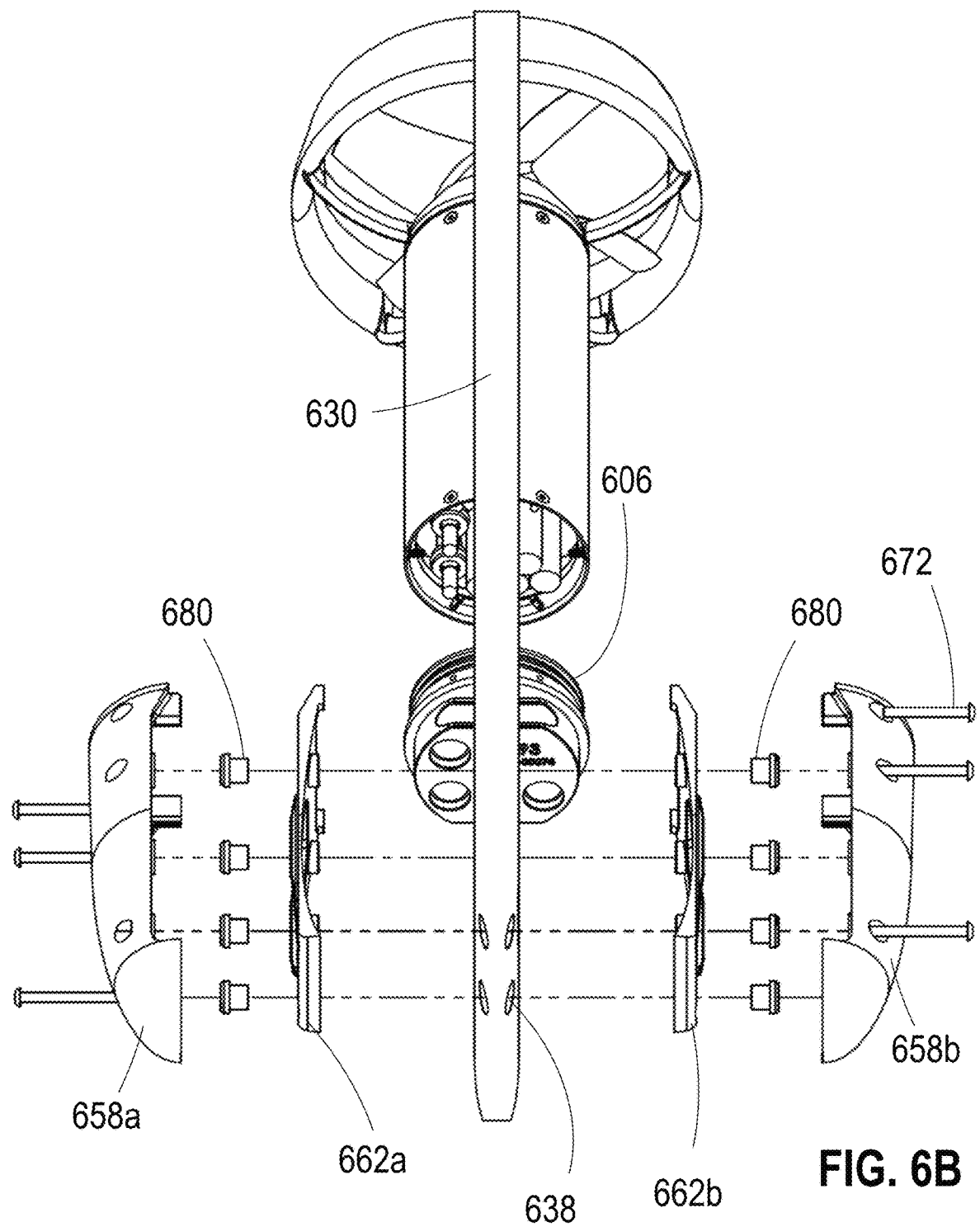
FIG. 6B is an exploded view from in front and above the embodiment of FIG. 6A.
Figure 6C:
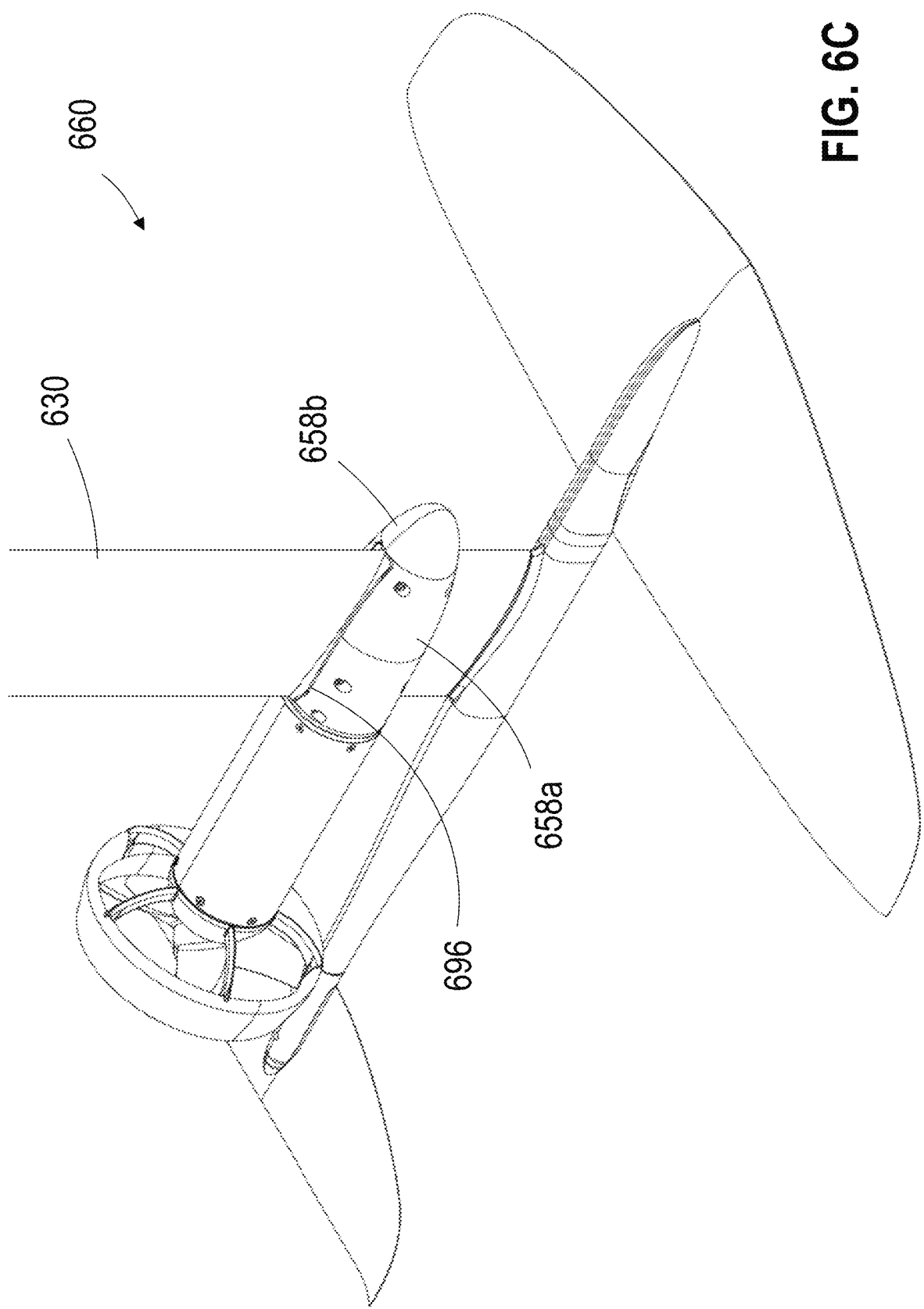
FIG. 6C is an isometric view of the assembled propulsion assembly of FIG. 6A.
Figure 6D:
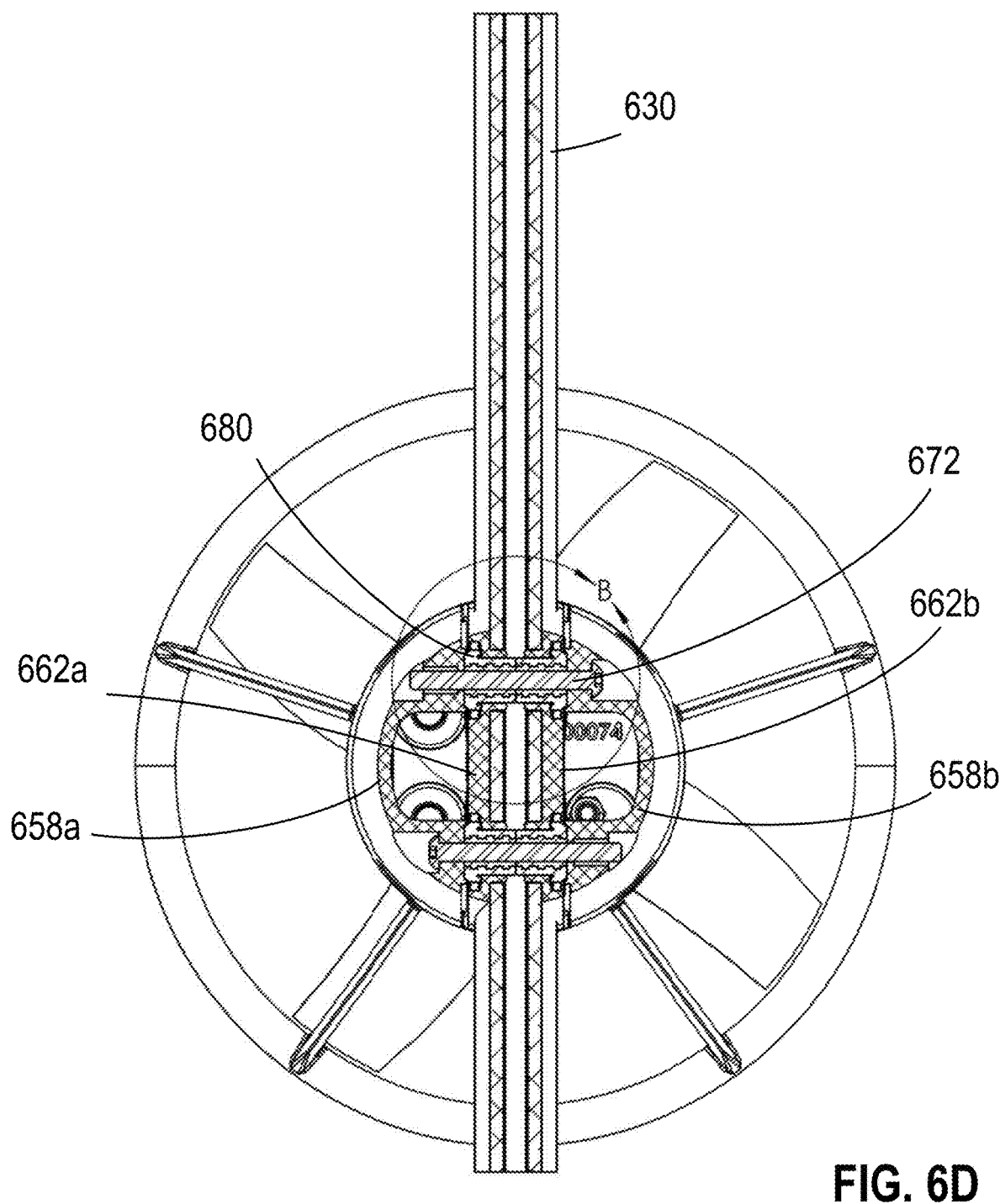
FIG. 6D is a cross-sectional view of the assembled propulsion assembly of FIG. 6C, taken along a plane extending through the longitudinal axes of two vertically aligned through-pins.
Figure 6E:
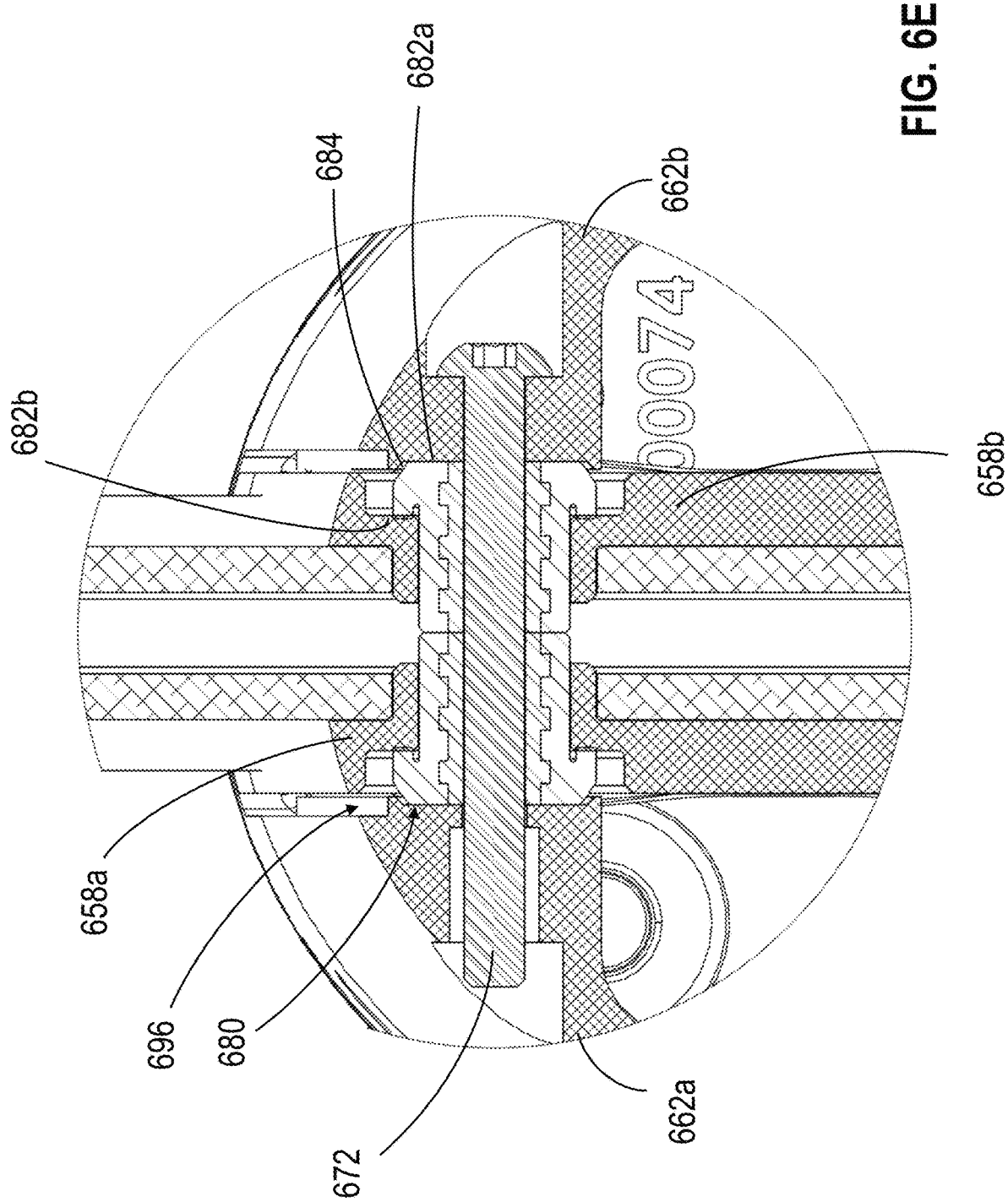
FIG. 6E is a detail cross-sectional view of section B of FIG. 6D.

FIG. 6A is an exploded isometric view of an embodiment of a propulsion assembly in which a propulsion pod is secured to a housing via a plurality of vibrationally-isolated through-pins. FIG. 6B is an exploded view from in front and above the embodiment of FIG. 6A. FIG. 6C is an isometric view of the assembled propulsion assembly of FIG. 6A. FIG. 6D is a cross-sectional view of the assembled propulsion assembly of FIG. 6C, taken along a plane extending through the longitudinal axes of two vertically aligned through-pins. FIG. 6E is a detail cross-sectional view of section B of FIG. 6D.

In the embodiment of FIGS. 6A to 6E, an anisotropically flexible vibration isolating coupling structure 670 is used to flexibly couple a propulsion pod to a strut 630 in the propulsion assembly 660. In the illustrated embodiment, the coupling structure 670 includes adaptive clamp components 662a and 662b disposed on either side of the strut 630. First and second housing sections 658a and 658b of the propulsion pod are located outward of the adaptive clamp components 662a and 662b on either side of the strut 630. Apertures 674 in the first and second housing sections 658a and 658b are axially aligned with the corresponding apertures 664 extending through each of the first and second adaptive clamp components 662a and 662b. The anisotropically flexible vibration isolating coupling structure 670 also includes through-pins 672 (see FIG. 6B)

In some embodiments, the cross-sectional diameter of the apertures 674 of the first and second housing sections 658a and 658b may be smaller than the smallest cross-sectional diameter of the apertures 664 of the first and second adaptive clamp components 662a and 662b. Because the through-pins 672 may be rigidly coupled to the first and second housing sections 658a and 658b, the apertures 674 can have a cross-sectional diameter which is only slightly larger than the shank of the through-pin 672. However, because the through-pins 672 are vibrationally isolated from the first and second housing sections 658a and 658b and the strut 630, the apertures 664 in the housing sections 658a and 658b and the apertures 638 in the strut 630 are larger, to accommodate at least the portions of the elastomeric bushings 680 inward of the inner abutment surfaces 682b.

Through-pins 672 are inserted through each of the apertures 664 of the first and second adaptive clamp components 662a and 662b and the corresponding apertures 638. Elastomeric bushings 680 are positioned on the through pins 672 on opposing sides of the strut 630, between the corresponding adaptive claim component and propulsion pod housing section. The through-pins 672 extend through the rigid inner sleeves of the elastomeric bushings 680, such that each through-pin is suspended by a pair of elastomeric bushings 680 on either side of the through-pin. The elastomeric portions of the elastomeric bushings 680 are in contact with the interior surfaces of the apertures 664 of the first and second adaptive clamp components 662a and 662b. In the illustrated embodiment, as can be seen in FIGS. 6D and 6E, the inner faces of each pair of elastomeric bushings 680 abut one another. In other embodiments, however, there may be some spacing between the inner faces of the elastomeric bushings 680 without allowing the rigid through-pin 672 to come into contact with a rigid portion of the strut 630 or the first and second adaptive clamp components 662a and 662b.

The through-pins 672 may be directly in contact with rigid portions of the first and second housing sections 658a and 658b. The through-pins 672 may be secured in place relative to the first and second housing sections 658a and 658b by any suitable mechanism. In the illustrated embodiment, a through-pin 672 is be inserted through one of the first and second housing sections 658a and 658b, and a nut may be threaded onto a distal tip of the through pin 672, opposite the head of the through-pin 672, such that the nut and the head of the through-pin retain the first and second housing sections 658a and 658b relative to one another, with the propulsion pod suspended on the strut 630 via the vibrationally-isolated through pins 672.

In other embodiments, a through-pin 672 may be inserted through one of the first and second housing sections 658a and 658b and the distal tip of the through-pin 672, located away from the head of the through-pin 672, may be screwed into a threaded aperture in the other of the first and second housing sections 658a and 658b. In other embodiments, an axially extending threaded aperture may be located at one or both ends of the through-pin, and a retaining screw may be inserted through one of the first and second housing sections 658a and 658b and screwed into the axially extending threaded aperture. Any other suitable retention mechanism may also be used, such as a cotter pin or similar structure located outward of at least a portion of one of the first and second housing sections 658a and 658b.

In the illustrated embodiment, the structure also includes a pair of vibrationally coupled through-pins 672 which extend through grooves in the motor endbell 606, vibrationally coupling the endbell 606 to the housing of the propulsion pod. In other embodiments, however, as described in greater detail elsewhere herein, these additional vibrationally coupled through-pins 672 may be omitted, such that the endbell 606 is not directly coupled to the housing of the propulsion pod.

In addition, it can be seen in the illustrated embodiment that gaps 696 are provided between the first and second adaptive clamp components 662a and 662b and the first and second housing sections 658a and 658b, respectively, at the points at which the strut passes through the outer housing of the propulsion pod housing. The gaps 696 may be dimensioned to prevent direct vibrational coupling between the strut 630 and the propulsion pod housing, even when the strut 630 is canted relative to the propulsion pod housing in response to an applied load. In the absence of appropriately dimensioned gaps 696, the rigid portions of the housing might be brought into contact with the rigid strut, providing an additional direct vibrational transfer path which is not mitigated by the elastomeric bushings.

To further mitigate the risk of such vibrational transfer, one or both of the facing surfaces of the first and second housing sections 658a and 658b and/or the first and second adaptive clamp components 662a and 662b may be lined with an elastomeric material or include elastomeric projections (not shown). If an additional vibrational transfer path is formed by contact between the strut and the propulsion pod housing, the elastomeric material may mitigate or reduce the magnitude of the vibration transmission.

Although a wide variety of types and shapes of elastomeric bushings or similar structures may be used to vibrationally isolate the strut from the propulsion pod, the elastomeric bushing may be in some embodiments be configured to control or define a desired force feedback response of the elastomeric bushing to flexure of the strut relative to the propulsion pod. In particular, the beveled outer shoulder 584 of the bushing of FIG. 5A, which tapers to an outer face 582a having a comparatively smaller surface area, can provide a progressive force feedback profile which increases in a non-linear fashion in response to an increased applied load. This increase may be, for example, exponential over at least a portion of the force feedback profile.

For example, when a small load is applied to the strut, application of the load will result in a comparatively small degree of rotation of the strut relative to the roll or pitch axis of the hydrofoil watercraft. Because the through-pins 672 are rigidly coupled to the propulsion housing, the through-pins 672 will cant slightly within the apertures 664 within the first and second adaptive clamp components 662a and 662b. The strut roll will result in compression between a propulsion pod housing section and an adaptive clamp section of an upper portion of one of the elastomeric bushings 680 of each axially aligned pair of bushings. The strut roll will also result in a compression between the opposite propulsion pod housing section and adaptive clamp section of a lower part of the other elastomeric bushing 680 of each axially aligned pair.

The compression of the abutment surfaces of the adaptive clamp sections against the inner abutment surfaces 682b of the elastomeric bushings will compress the outer portion of the elastomeric bushing 680 as the outer portion of the elastomeric bushing will be squeezed between the abutment surface of adaptive clamp section and the inner surface of the propulsion pod housing. The restoring force of the compressed elastomeric bushing section will counter the strut roll. For small amounts of strut roll, the resulting restoring force will be small, due in part to the design of the outer profile of the elastomeric bushing 680 and the facing interior surface of the first and second housing sections 658a and 658b While the outer face 682a may abut or be positioned close to the facing interior surface of the housing section, there may be greater clearance between the beveled shoulder 684 and the housing section, allowing a degree of deformation of the elastomeric bushing into the clearance between the beveled shoulder 684 and the housing section. The flexible coupling provided by the anisotropically flexible vibration isolating coupling structure 670 may therefore provide a comparatively smaller amount of resistance over a narrow initial range of strut roll, for example.

As the magnitude of the loading increases, and the beveled shoulder 684 is also compressed against the facing interior surface of the housing portion, further deformation of the elastomeric bushings 680 results in an increase in the magnitude of the restoring force provided by the elastomeric bushings 680. Due to the design of the elastomeric bushings 680, this increase in restoring force with increased loading is non-linear. In particular, the resistance to further strut roll and/or pitch can increase substantially with increased flexure of the strut relative to the propulsion pod increases. This non-linear force feedback profile can allow some strut roll and/or pitch within a narrow range, while inhibiting or preventing further strut roll and/or pitch beyond that range.

The shape of the elastomeric bushings 680 may also provide other structural benefits. For example, the tapered shape of the elastomeric bushings 680 can reduce or mitigate the likelihood of buckling of the bushing shoulder under heavy loads. The tapered shape of the elastomeric bushings 680 can help to maintain the shape of the bushing during high force conditions, reducing the likelihood of failure due to buckling which can more easily occur if the outer portion of the elastomeric bushing 680 were to have a more cylindrical profile. Furthermore, even if buckling occurs, the tapered shape of the elastomeric bushings 680 provides greater control over the shape of the elastomeric bushing 680 under buckling conditions.

In addition to the design of the elastomeric bushings 680, other aspects of the design of the anisotropically flexible vibration isolating coupling structure 670 can be used to control the degree of flexibility in various directions. For example, in the illustrated embodiment, the longitudinal spacing between the fore and aft sets of through holes is greater than the vertical spacing between the upper and lower sets of through holes.

For a radially symmetric elastomeric bushing, a given degree of strut roll will result in a smaller amount of deformation of the elastomeric bushings than would the same degree of strut pitch. The hole pattern can be used to provide a desired balance between strut roll flexibility and strut pitch flexibility. Altering the hole pattern can change the balance between resistance to strut roll and resistance to strut pitch.

In addition, the restoring force exerted by the elastomeric bushings may be adjusted based on an axially compressive force applied to the elastomeric bushings from the through pins and their securement mechanisms. For example, if a through pin extends through each side of the propulsion pod housing to contact a threaded nut on the other side, the nut can be tightened or loosened to control the compressive force applied to the elastomeric bushings in the absence of strut roll and/or pitch. If this compressive force is increased, the elastomeric bushing may be more resistant to additional strut roll and/or pitch, while if the compressive force is decreased, the elastomeric bushing may be less resistant to additional strut roll and/or pitch. The securement of the through-pins can provide a way to tune the flexibility of the vibration isolating coupling without altering the design or structure of the coupling.

In some embodiments, the anisotropically flexible vibration isolating coupling structure 670 may be asymmetrically designed, such as to compensate for the effect of motor operation on strut roll. Because the motor and propeller of the propulsion pod will spin in a given direction, the strut may be under an asymmetrical load due to the resulting moment applied to the propulsion pod about the rotational axis of the roll axis of the hydrofoil watercraft. The magnitude of the applied moment will increase as the propeller speed increases.

Figure 7:
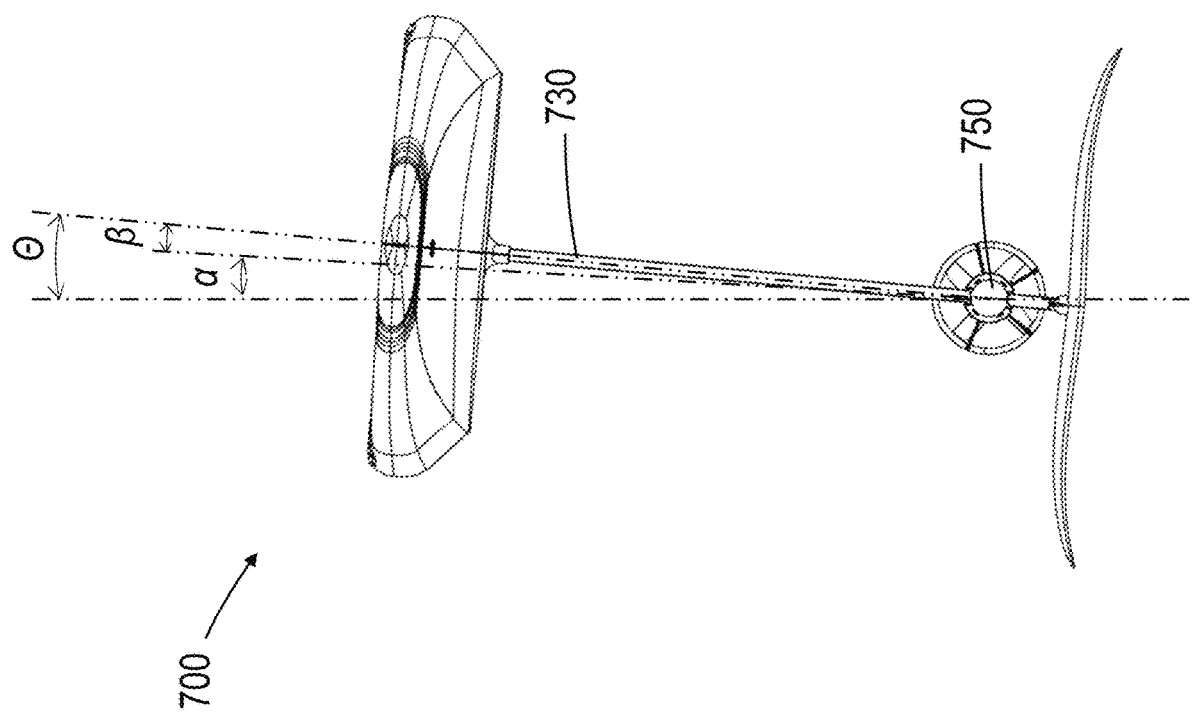
FIG. 7 is a front view of a hydrofoil watercraft undergoing strut roll relative to the propulsion housing.

In embodiments in which the strut is rigidly coupled to the propulsion pod, this applied moment may have a minimal effect on the operation of the hydrofoil watercraft. However, in embodiments in which the coupling between the strut and the propulsion pod has some degree of flexibility, particularly when some degree of strut roll is permitted by the flexible coupling, the added moment applied due to operation of the propulsion pod may cause an asymmetry in the resistance to strut roll in opposite directions. In some embodiments, an anisotropically flexible vibration isolating coupling structure 670 may have an asymmetric design to compensate for the propulsion pod moment. This asymmetrical design may include, for example, varying the design of the elastomeric bushings and/or facing interior surface, such as an arrangement in which the top right and lower left bushings being configured to provide a greater restoring force, In other embodiments, Elliptical or radial offset designs may be used for bushings and/or for through-holes receiving bushings. In other embodiments, an asymmetrical taper may be provided on a through-pin. In other embodiments, further adjustments may be made to compensate for an expected asymmetrical load, such as by providing gaps 696 of different widths on either side of the strut 630 with different widths FIG. 7 is a front view of a hydrofoil watercraft undergoing strut roll relative to the propulsion housing. In a weight-shift controlled watercraft such as hydrofoil watercraft 700, the watercraft may undergo strut roll as a function of the rider shifting their weight relative to the board to control the operation of the watercraft. In contrast to designs in which the strut is rigidly coupled to a propulsion pod, and the orientation of the strut 730 relative to the propulsion pod 750 is maintained even when the hydrofoil watercraft 700 rolls to one side or another, a vibration isolating flexible coupling between the strut and the propulsion pod can allow additional strut roll relative to the propulsion pod when the hydrofoil watercraft 700 rolls to a given side.

As shown in FIG. 7, the strut 730 of the hydrofoil watercraft 700 is oriented at an overall angle Θ to the normal. The angle Θ is a combination of the overall roll angle α of the propulsion pod 750 relative to the normal, and an additional strut roll angle β relative to the propulsion pod 750. The range of additional strut roll angle β will be dependent on the design of the elastomeric bushing and other components of the hydrofoil watercraft but may in some embodiments be configured to be less than 3 degrees.

Figure 8B:
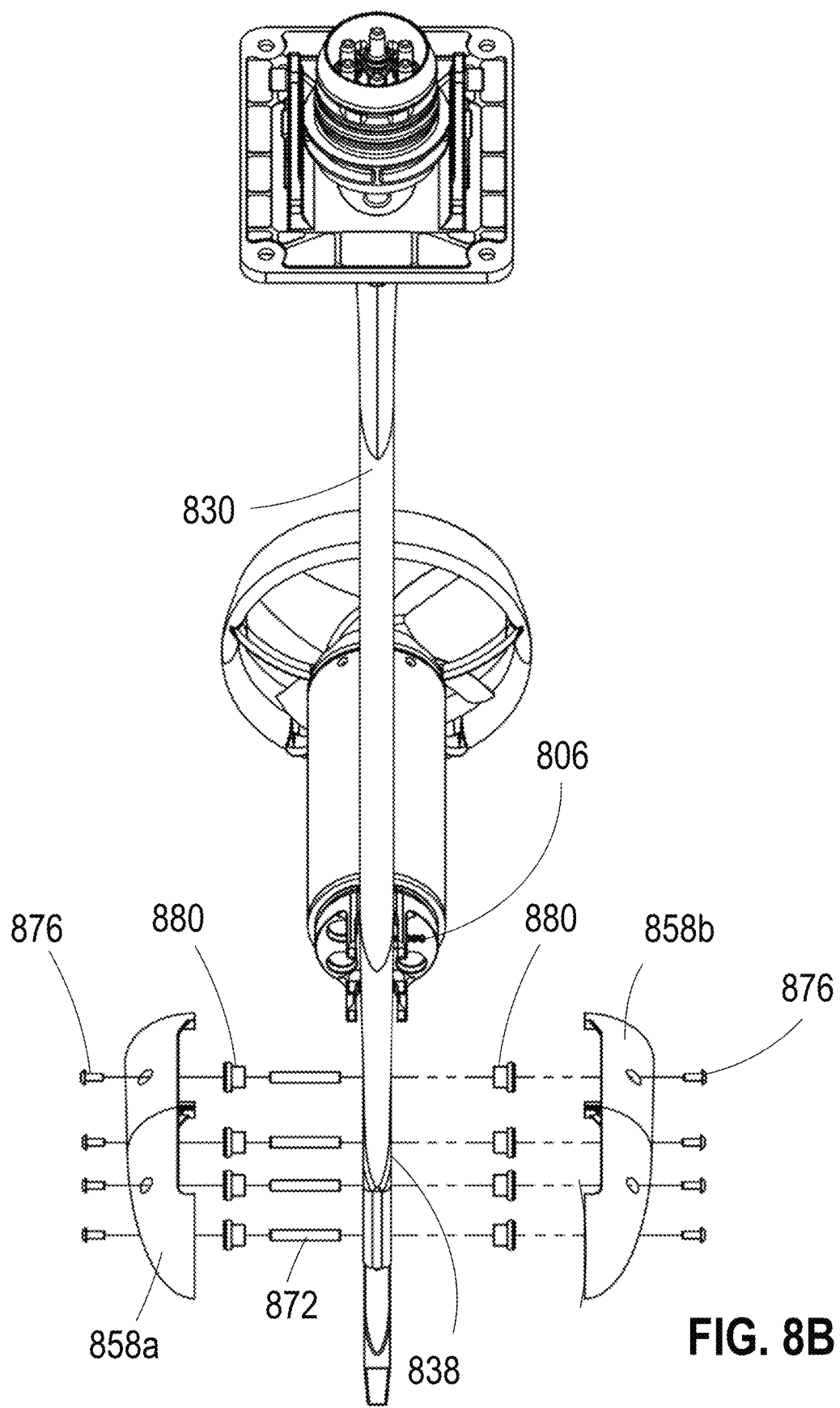
FIG. 8B is an exploded front view of the embodiment of FIG. 8A.
Figure 8C:
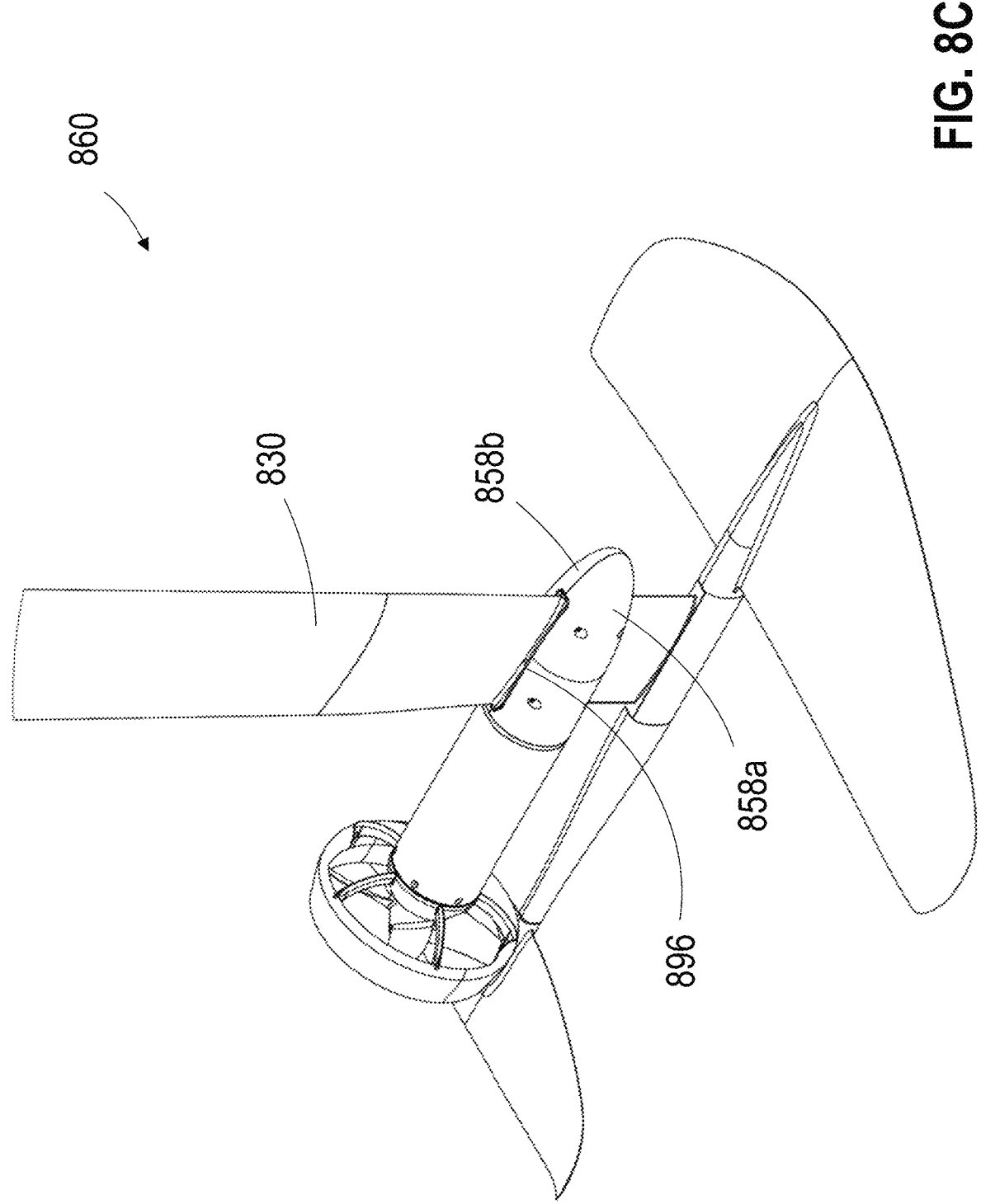
FIG. 8C is an isometric view of the assembled embodiment of FIG. 8A.

FIG. 8A is an exploded isometric view of another embodiment of a propulsion assembly in which a propulsion pod is secured to a housing via a plurality of vibrationally-isolated through pins. FIG. 8B is an exploded front view of the embodiment of FIG. 8A. FIG. 8C is an isometric view of the assembled embodiment of FIG. 8A.

The propulsion assembly 860 is similar to the propulsion assembly 660 of FIG. 6A but differs in two significant ways. In particular, the propulsion assembly 860 does not include discrete adaptive clamp structures configured to be coupled to the strut to further define through-holes 838 for the through-pins 872 and elastomeric bushings 880. Instead, the strut 830 includes an integral thicker connection portion 832 which defines channels 838 extending therethrough, similar to the channels formed by the combination of through holes 638 and apertures 664 in the propulsion assembly 660 of FIG. 6A.

In some embodiments, an adaptive clamp structure may be used in conjunction with struts having substantially constant cross-sections, such as metallic struts which may be formed by an extrusion process. Embodiments which include an integral thicker connection portion, such as connection portion 832 of FIG. 8A, can include struts formed in a molding or casting process, such as carbon fiber struts which may be more readily fabricated in shapes which have a varying cross-sectional shape along their length.

The propulsion assembly 860 also differs from the propulsion assembly 660 of FIG. 6A to 6E in that the propulsion assembly 860 does not include a plurality of vibrationally coupled bolts which rigidly couple the motor endbell 806 to the first and second housing sections 858a and 858b of the propulsion pod. Instead, as the motor endbell 806 is not directly coupled to the housing of the propulsion pod, the vibrational transfer path may run directly to the first and second housing sections 658a and 658b from the motor and propeller 802, rather than passing through the endbell 806, in contrast to the embodiment of FIG. 6A.

It can also be seen in FIGS. 8A and 8B that the through-pins 872 differ in their structure and manner of securement from the through pins 672 of FIG. 6A. In the embodiment of FIG. 8A, the through-pins 872 have a substantially constant outer cross-sectional shape, and are retained wholly between the first and second housing sections 858a and 858b of the propulsion pod, rather than extending through at least one of the first and second housing sections 858a and 858b. Instead, axially extending threaded apertures are located in each end of the through-pin 872 and retaining screws 876 may be inserted through each of the first and second housing sections 858a and 858b and screwed into the axially extending threaded apertures of the through-pin 872.

While the embodiment of FIGS. 8A to 8C includes a strut having integral thickness variations and omits a rigid coupling between the propulsion pod housing components and the motor endbell, other embodiments may include a wide variety of other design combinations. For example, in some embodiments, a strut having integral thickness variations may be used in conjunction with vibrationally coupled connections between the propulsion pod housing components and the motor endbell.

Figure 9A:
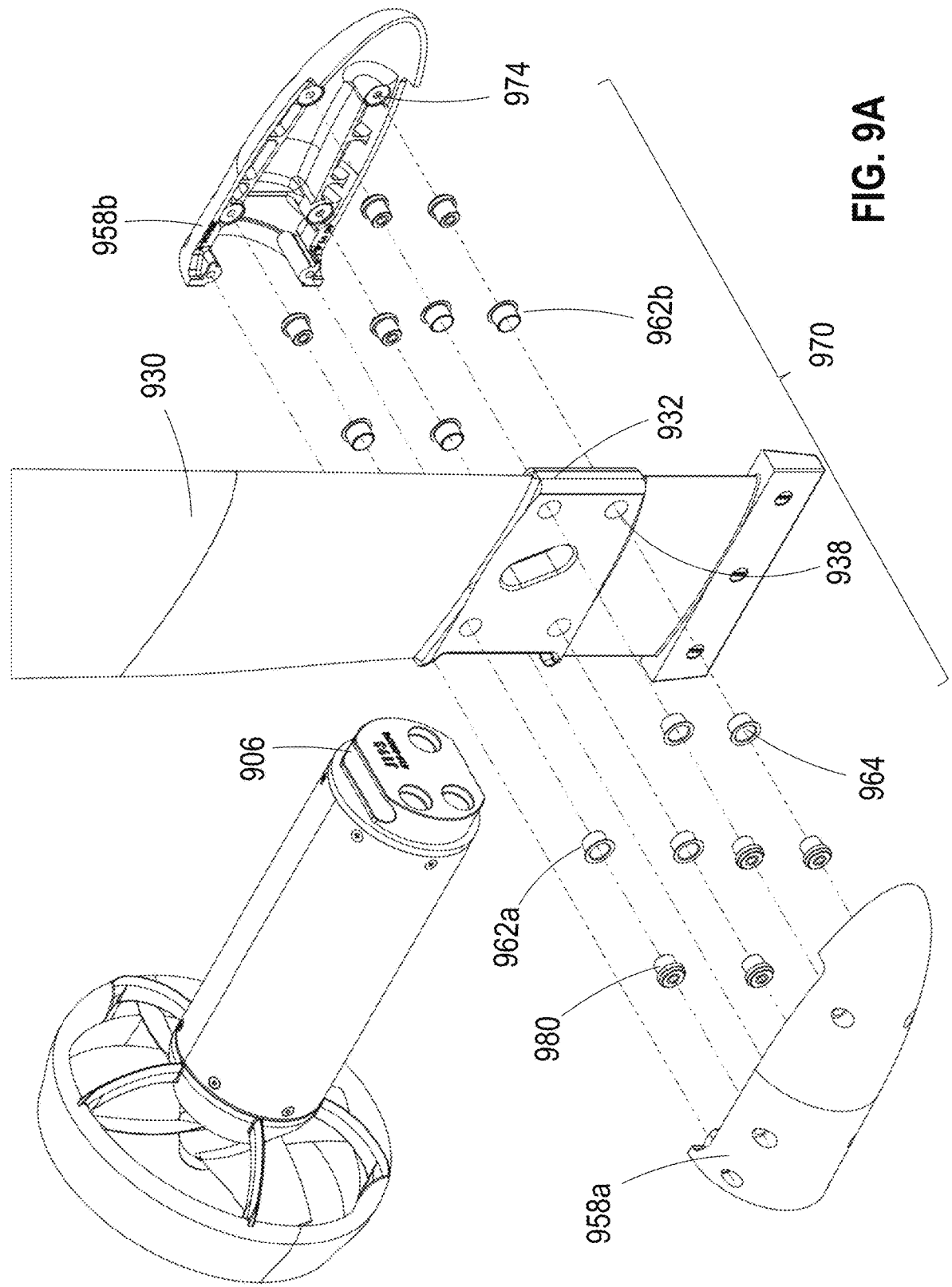
FIG. 9A is an exploded isometric view of another embodiment of a propulsion assembly in which a propulsion pod is secured to a housing via a plurality of vibrationally-isolated through-pins.
Figure 9B:
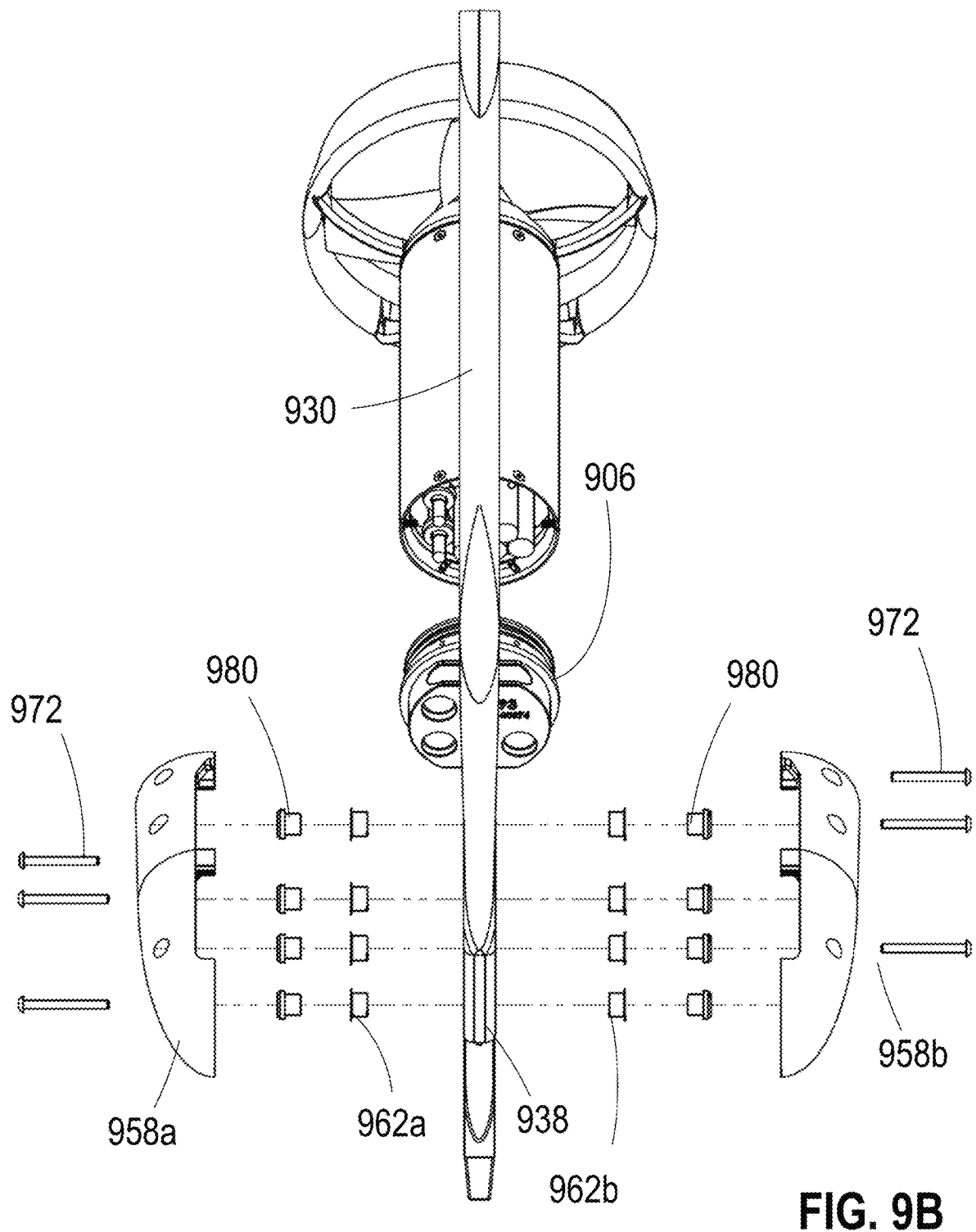
FIG. 9B is an exploded view from in front and above the embodiment of FIG. 9A.
Figure 9C:
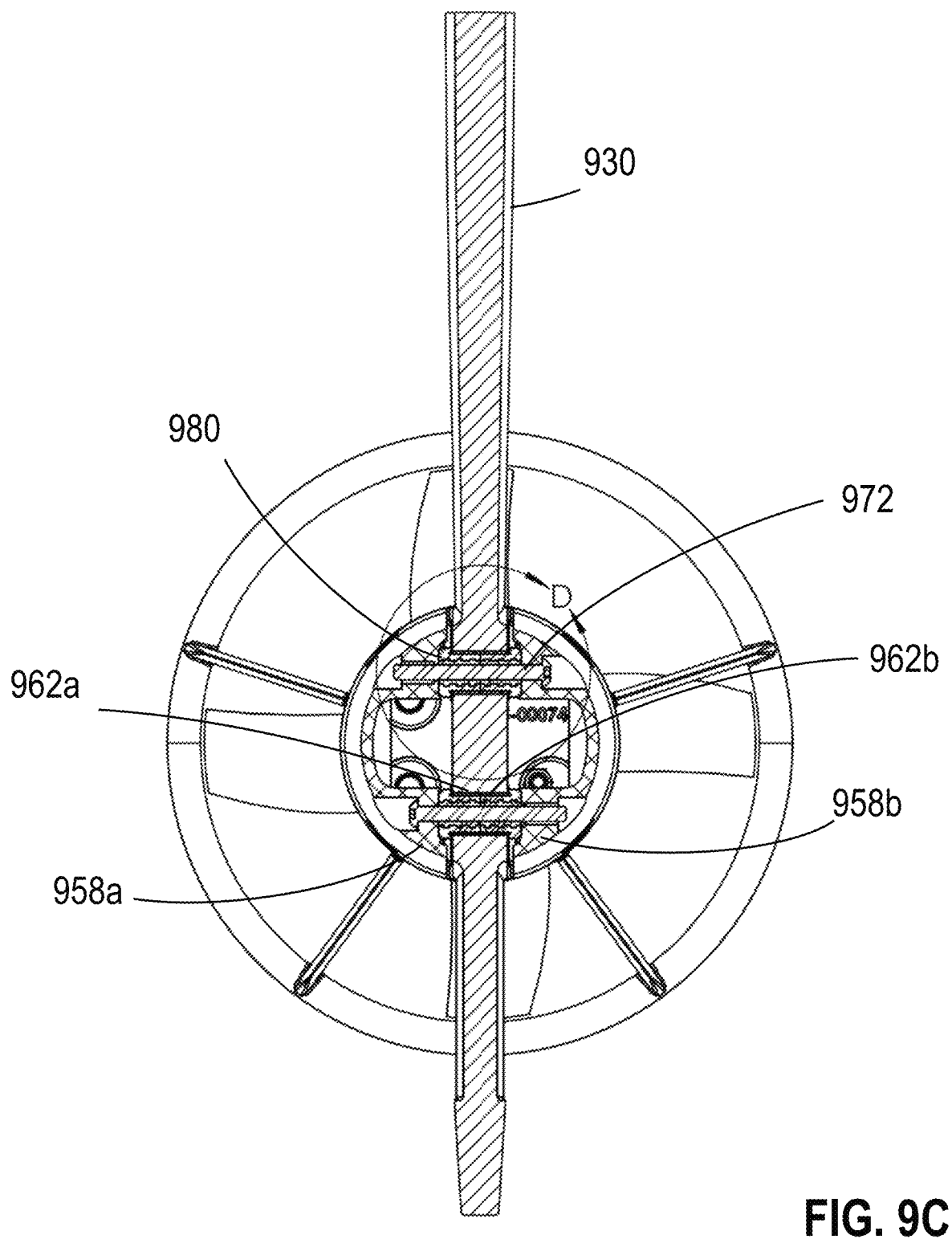
FIG. 9C is a cross-sectional view of the assembled propulsion assembly taken along a plane extending through the longitudinal axes of two vertically aligned through-pins.
Figure 9D:
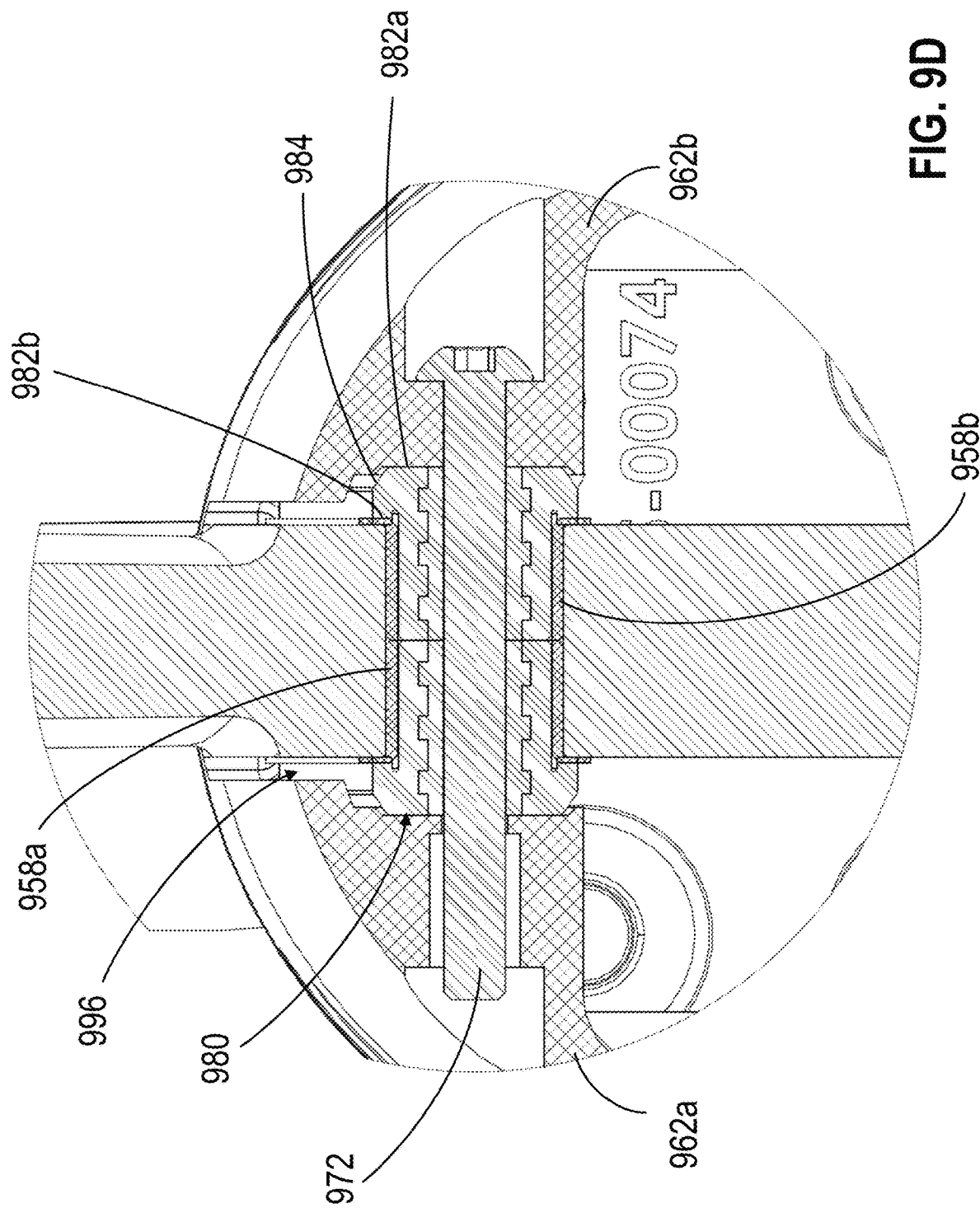
FIG. 9D is a detail cross-sectional view of section D of FIG. 9C.
Figure 9E:
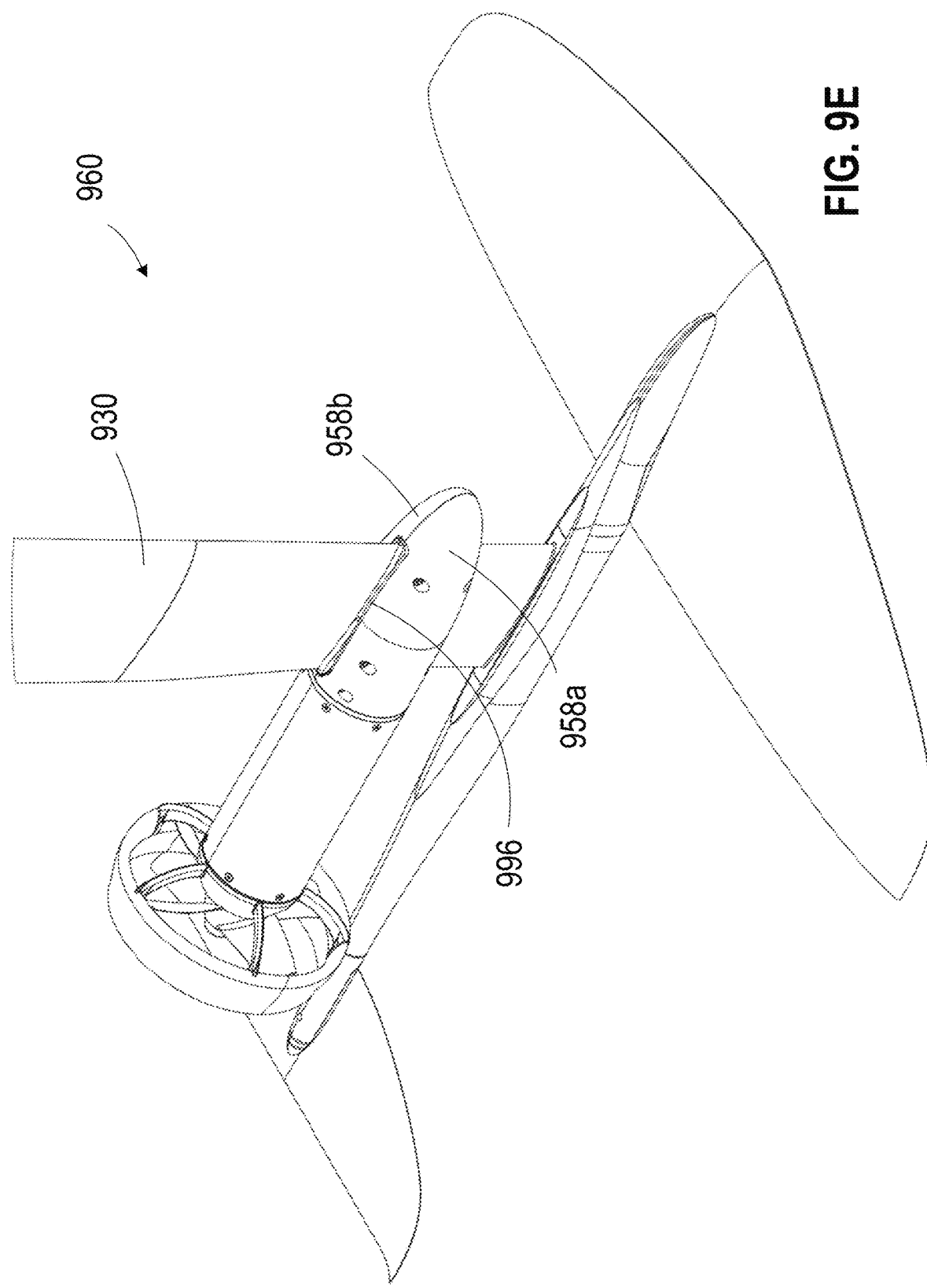
FIG. 9E is an isometric view of the assembled propulsion assembly of FIG. 9A.

FIG. 9A is an exploded isometric view of another embodiment of a propulsion assembly in which a propulsion pod is secured to a housing via a plurality of vibrationally-isolated through-pins. FIG. 9B is an exploded view from in front and above the embodiment of FIG. 9A. FIG. 9C is an isometric view of the assembled propulsion assembly of FIG. 9A. FIG. 9D is a cross-sectional view of the assembled propulsion assembly of FIG. 9C, taken along a plane extending through the longitudinal axes of two vertically aligned through-pins. FIG. 9E is a detail cross-sectional view of section D of FIG. 9D.

The design of strut 930 is similar to that of strut 830 of FIGS. 8A to 8C and includes an integral thicker connection portion 932 which defines apertures 938 extending therethrough. However, the vibration isolating coupling structure 970 includes sleeves 962a and 962b configured to be inserted into the apertures 938 from either side of the strut 930. These sleeves 962a and 962b may in some embodiments be made from a different material than the remainder of the strut 930, such as a more material which may be more resistant to wear. The sleeves 962a and 962b may also be used to adjust the dimensions of the apertures 938 extending through the strut 930. The interior dimensions of the sleeves 962a and 962b are dimensioned to receive a portion of the elastomeric bushings 980. Thus, rather than a single clamping adapter assembly, a plurality of discrete adapter components may be used, for a wide range of purposes. In the illustrated embodiment, the through-pins 972 have a head at one end, and a shank dimensioned to extend through apertures 974 in both of the propulsion pod housing sections 958a and 958b, and secured to a threaded nut or other securement device on the opposite side of the propulsion pod as the bolt head.

It can be seen in FIGS. 9D and 9E that the channel defined by sleeves 962a and 962b extending through the strut 930 has a substantially constant diameter, and that the outer portions of the sleeves 962a and 962b extend radially outward to define abutment surfaces configured to contact the elastomeric bushings 980. The abutment surfaces of the sleeves 962a and 962b adjacent the inner abutment surfaces 982b of the elastomeric bushings 980 are on the outer surface of the strut 930, rather than being recessed within the strut 930. It can also be seen in FIG. 9E that the sleeves 962a and 962b include an outwardly projecting portion which is configured to engage a notch between the outer sleeve portion and the inner sleeve portion of the elastomeric bushing 980, although other embodiments may include a flat outer face of the sleeves 962a and 962b.

Figure 10A:
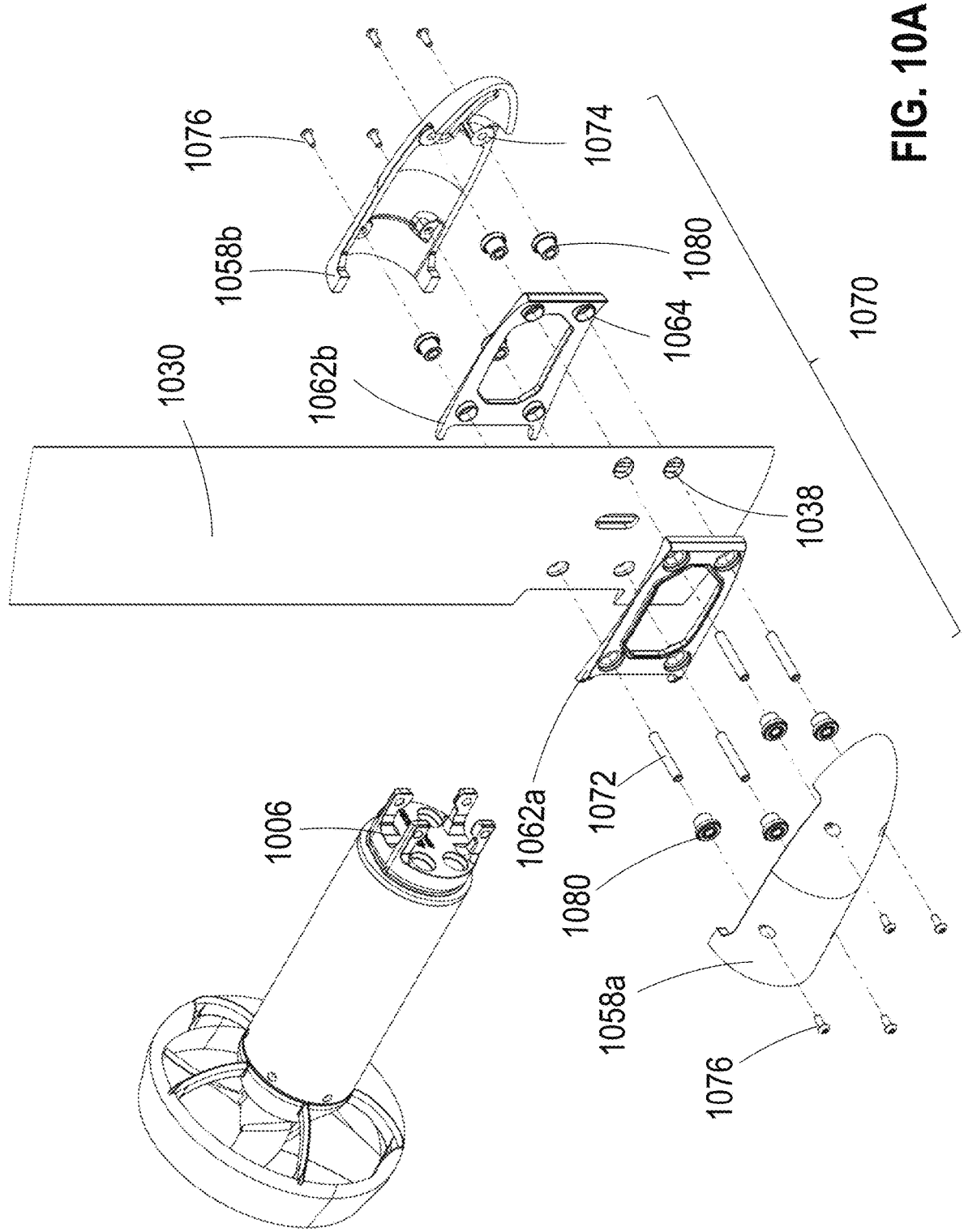
FIG. 10A is an exploded isometric view of another embodiment of a propulsion assembly in which a propulsion pod is secured to a housing via a plurality of vibrationally-isolated through pins.
Figure 10B:
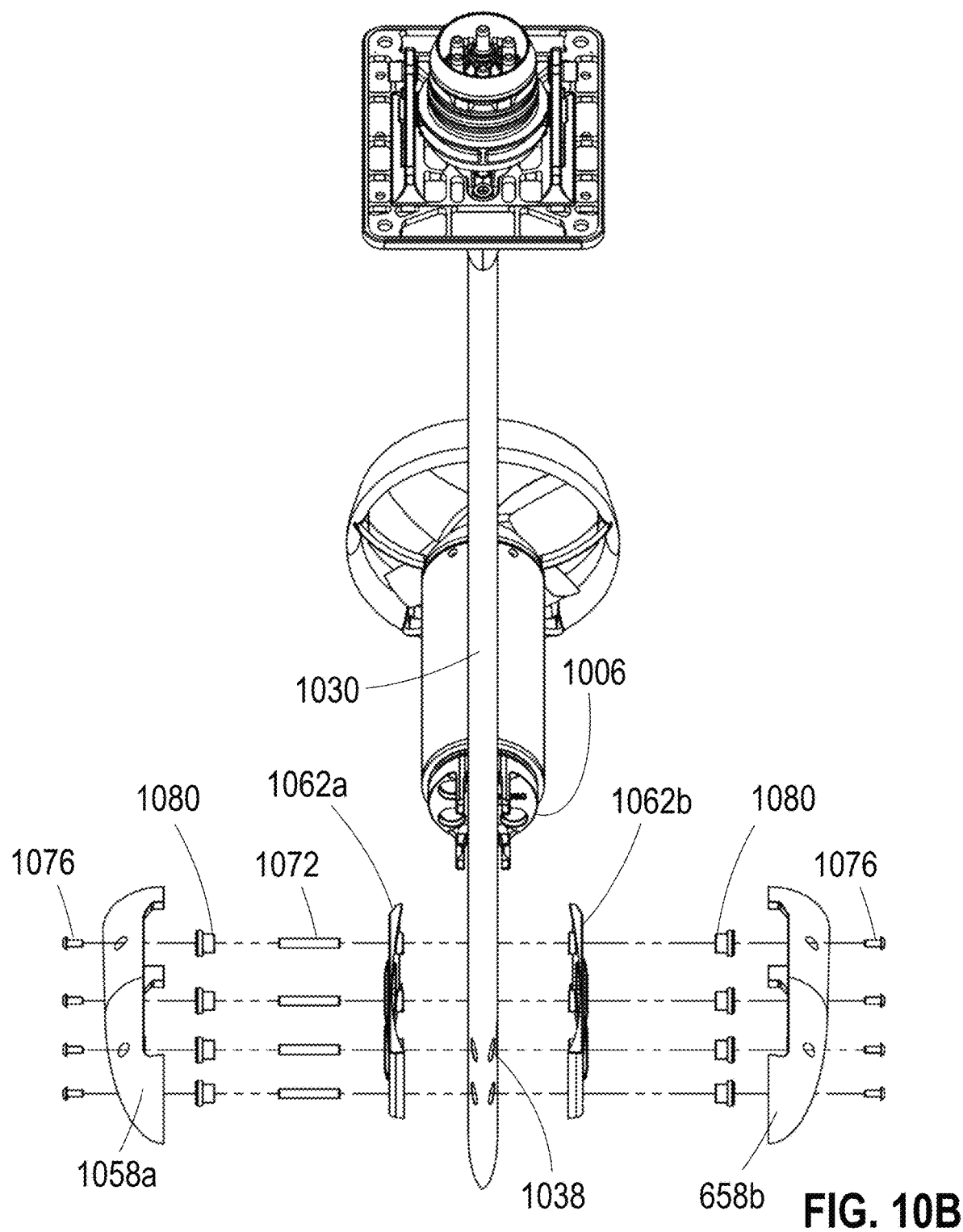
FIG. 10B is an exploded view from above and in front of embodiment of FIG. 10A.
Figure 10C:
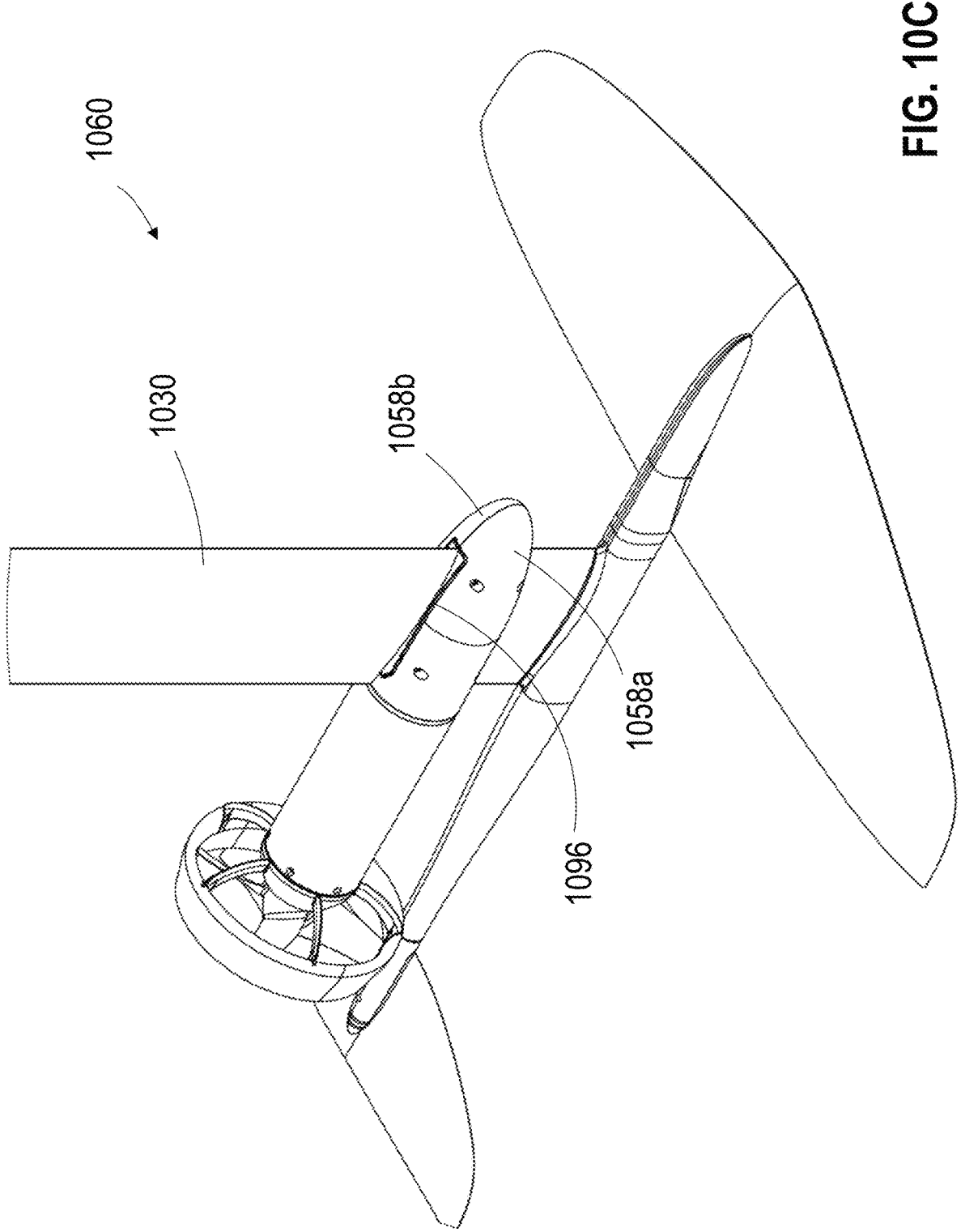
FIG. 10C is an isometric view of the assembled embodiment of FIG. 10A.

FIG. 10A is an exploded isometric view of another embodiment of a propulsion assembly in which a propulsion pod is secured to a housing via a plurality of vibrationally-isolated through pins. FIG. 10B is an exploded view from above and in front of embodiment of FIG. 10A. FIG. 10C is an isometric view of the assembled embodiment of FIG. 10A.

The strut 1030 is similar to the strut 630 of FIG. 6A and is used in conjunction with adaptive clamp components 1062a and 1062b disposed on either side of the strut 1030. First and second housing sections 1058a and 1058b of the propulsion pod are located outward of the adaptive clamp components 1062a and 1062b on either side of the strut 1030. Through-pins are inserted through the apertures 1074 in the first and second housing sections 1058*a* and 1058*b* and the apertures 664 extending through each of the first and second adaptive clamp components 1062*a* and 1062*b*.

Like the propulsion assembly 860 of FIGS. 8A to 8C, the propulsion assembly 1060 does not include a rigid coupling between the propulsion pod housing sections 1058*a* and 1058*b* and the motor endbell 1006. As the motor endbell 1006 is not directly coupled to the housing of the propulsion pod, a vibrational transfer path may run directly to the first and second housing sections 1058*a* and 1058*b* from the motor and propeller, rather than passing through the endbell 1006.

Although propulsion assemblies embodying certain combinations of features have been specifically illustrated, embodiments including other combinations of features may also be used. In many of the embodiments of propulsion assemblies discussed herein, the rigid components of the strut are vibrationally isolated from the propulsion pod flexibly coupled to the strut. This minimizes transmission of vibration from the propulsion pod to the strut through the mounting structure, ultimately isolating the support platform and rider from a substantial amount of vibration generated by the operation of the propulsion pod. These vibrational isolation structures may also result in a reduction in the amount of noise generated by the operation of the hydrofoil watercraft, and in particular the amount of noise generated in the range of human hearing. Although the mounting components are vibrationally isolated from one another, transmission of power from the battery pack through the strut to the electric motor may require a direct connection, and may utilize thick wiring which may transmit some vibrations from the motor and/or propeller. However, any vibration transmitted through the thick power wire may be minimal in comparison to the vibration that would be transmitted through a rigid, non-isolating mounting structure coupling the propulsion pod to the strut.

Figure 11A:
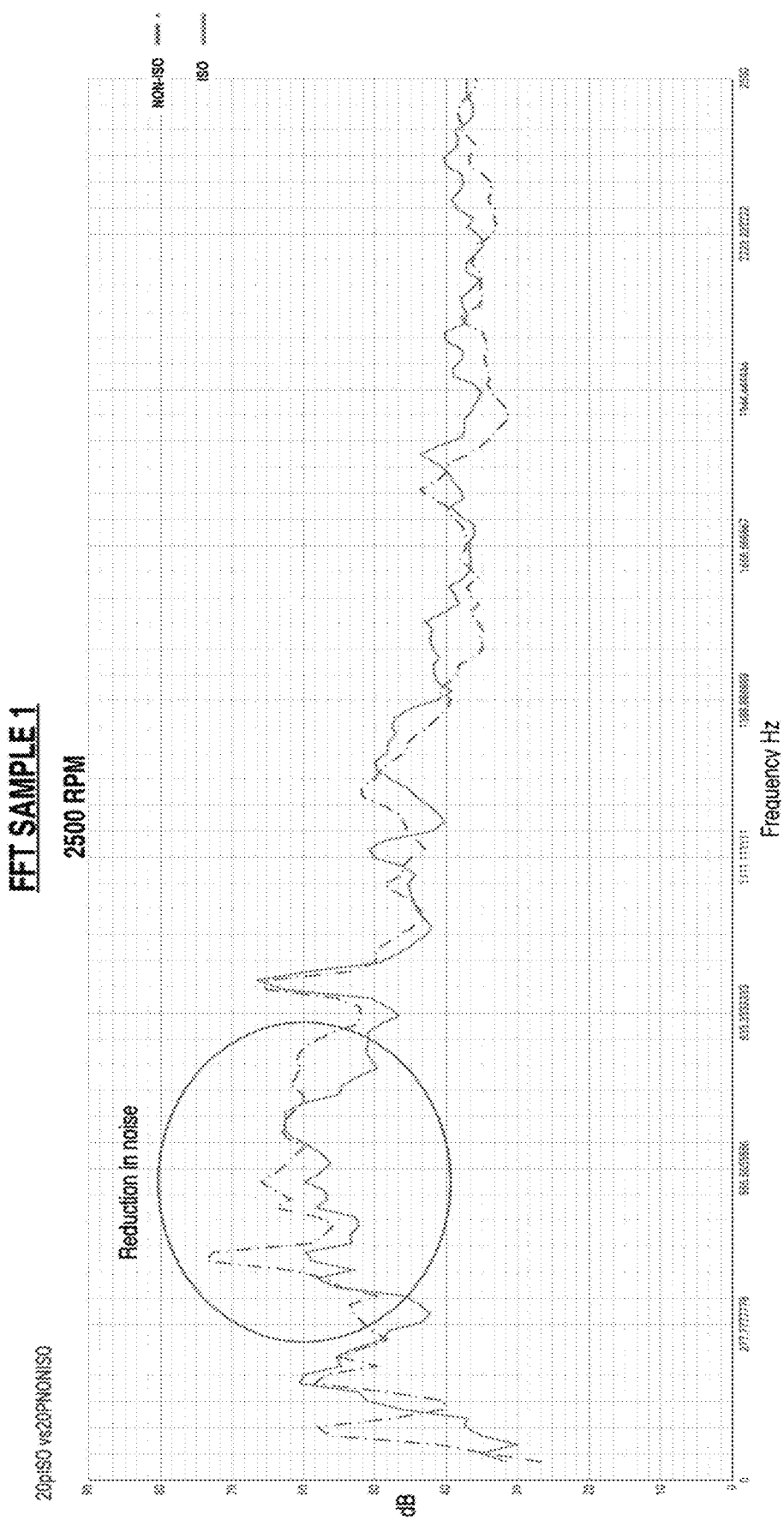
FIG. 11A is a plot of measured noise as a function of frequency, illustrating a reduction in noise achieved by the use of a vibration isolating mounting structure in comparison to a non-isolating mounting structure.
Figure 11B:
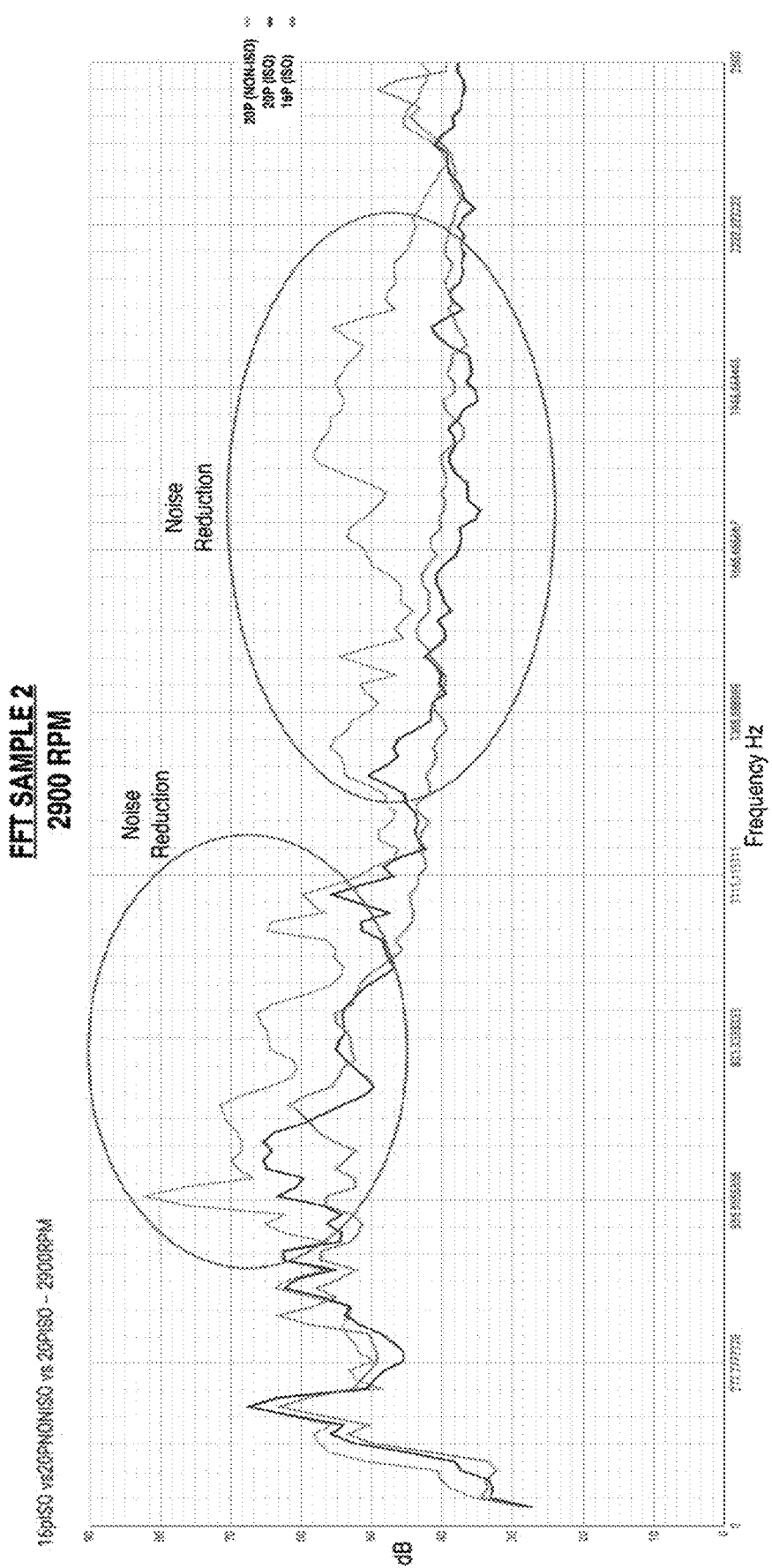
FIG. 11B is another plot of measured noise as a function of frequency, illustrating reductions in noise achieved by the use of vibration isolating mounting structures in comparison to a non-isolating mounting structure.

Embodiments of vibration isolating mounts have been shown to be effective at reducing noise generated by operation of a watercraft such as an electric hydrofoil watercraft. FIG. 11A is a plot of measured noise as a function of frequency, illustrating a reduction in noise achieved by the use of a vibration isolating mounting structure in comparison to a non-isolating mounting structure. FIG. 11B is another plot of measured noise as a function of frequency, illustrating reductions in noise achieved by the use of vibration isolating mounting structures in comparison to a non-isolating mounting structure. It can be seen in each of these figures that the embodiments which include a vibration isolating mechanism such as those described herein are effective at reducing noise generated by the operation of the watercraft, and in particular reducing noise within the range of human hearing.

As discussed above, in some embodiments, a gap may be provided between the strut and the propulsion pod housing sections, to prevent contact between rigid portions of the propulsion pod housing and rigid portions of the strut. However, the inclusion of such a gap can affect the hydrodynamic profile of the propulsion pod and can have an impact on performance of the watercraft.

In some embodiments, the propulsion pod may include additional structures configured to compensate for the presence of these gaps in the propulsion pod housing. For example, in some embodiments, flexible gaskets can be supported by one or both of the strut and the propulsion pod housing and be used to fill at least a portion of these gaps. If the gasket comprises an elastomeric material, vibration transmission through the gasket may be minimized, and the presence of an elastomeric gasket can help to maintain separation between rigid portions of the strut and rigid portions of the propulsion pod housing, even at the edges of the strut roll range. In other embodiments, the propulsion pod may include one or more deflectors positioned fore of these gaps, to alter the hydrodynamic profile of the propulsion pod and minimize the effect of the gaps in the propulsion pod housing. Other suitable mechanisms may also be used.

Although the illustrated embodiments depict the propulsion assembly as being connected to a point on the strut between the hydrofoil and the support platform, other arrangements of the propulsion assembly and hydrofoil relative to the strut may be used in other embodiments. For example, in some embodiments, the propulsion pod may be attached at the base of the strut, along with the hydrofoil, such as in the embodiments shown in FIGS. 1 and 7B in the attached Appendix, and in other figures in the attached Appendix. In such an embodiment, the hydrofoil may be rigidly coupled to the strut, and the propulsion pod formed around a portion of the hydrofoil or a structure supporting the hydrofoil to allow the propulsion mechanism to be vibrationally isolated from the strut.

In the illustrated embodiments, the vibration isolation structure which isolates the motor and propeller and the strut is located at the connection between the propulsion pod and the strut. However, in other embodiments, the vibration isolation structure may be located within a portion of the propulsion pod located away from the strut. For example, an elastomeric sleeve or other isolating elastomeric structure may be formed around the motor and propeller within the propulsion pod, isolating those structures from the surrounding portions of the propulsion pod and preventing contact between rigid components coupled to the motor and/or propeller and rigid components coupled to the strut. Such an elastomeric sleeve may be substantially larger in diameter than the elastomeric bushings of the illustrated embodiment.

Figure 12A:
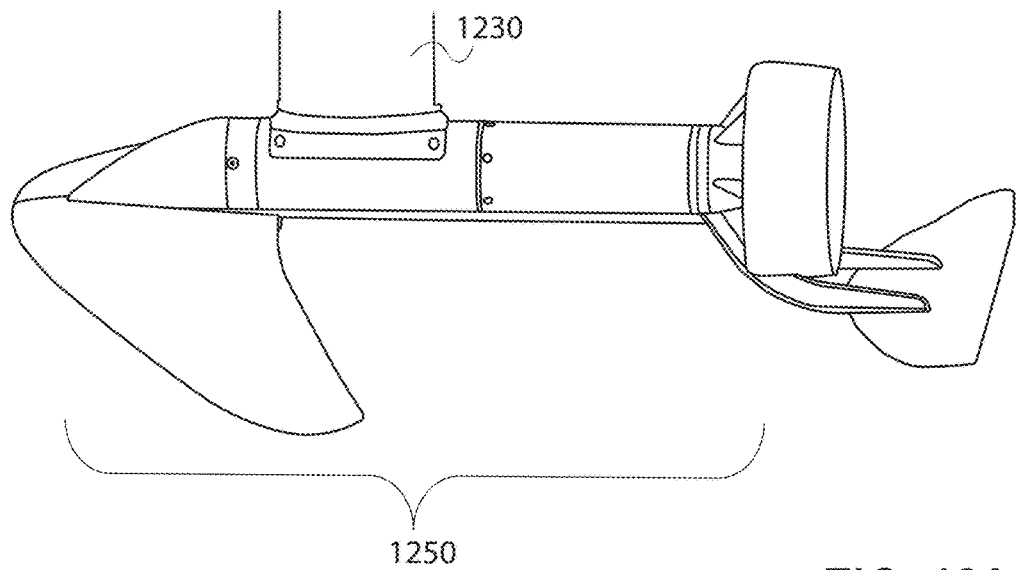
FIG. 12A is a perspective view of a combination propulsion pod and hydrofoil structure, coupled to a strut at the base of the strut.
Figure 12B:
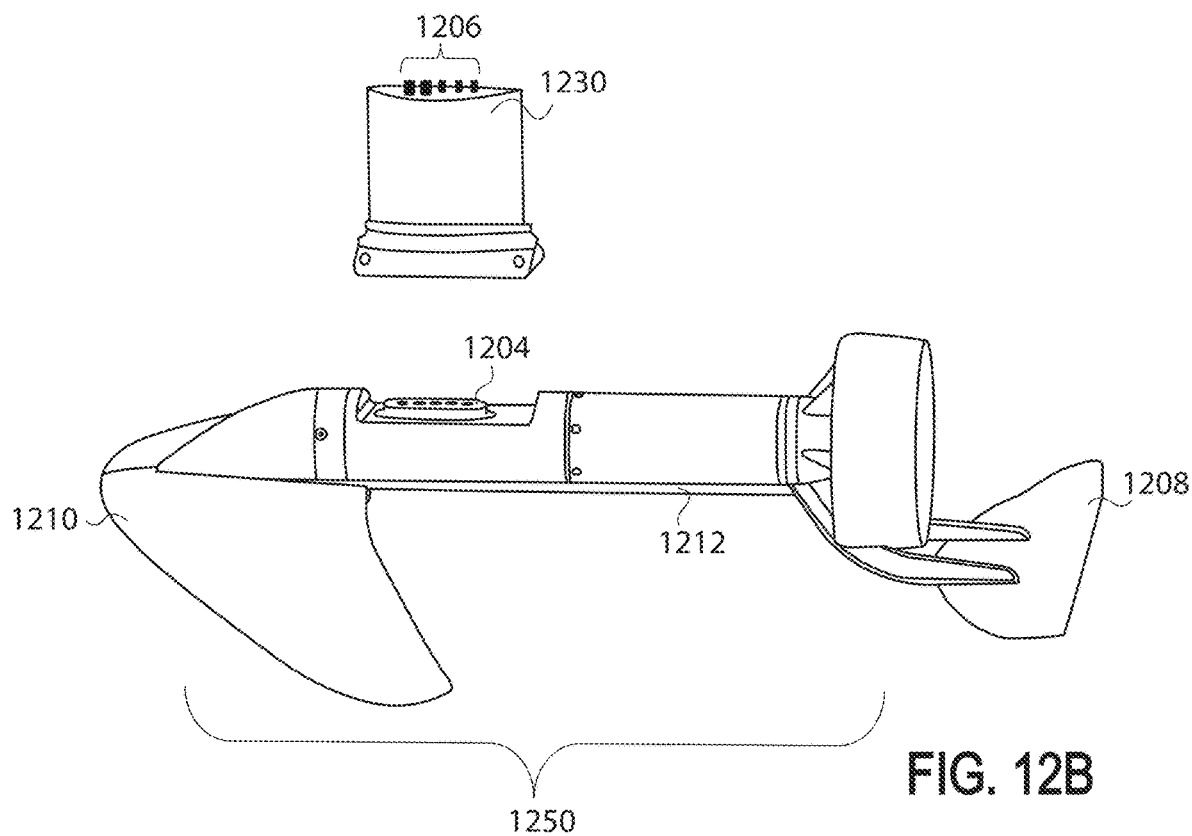
FIG. 12B is an exploded assembly view of the combination propulsion pod and hydrofoil structure of FIG. 12A shown detached from the strut.

FIG. 12A is a perspective view of a combination propulsion pod and hydrofoil structure, coupled to a strut at the base of the strut. FIG. 12B is an exploded assembly view of the combination propulsion pod and hydrofoil structure of FIG. 12A shown detached from the strut. The combination propulsion pod and hydrofoil structure 1250 includes a propulsion pod fuselage housing 1212 which supports the front or main foil 1210 at the front of the housing 1212, and a rear foil 1208 at the rear of the fuselage, beneath the propeller.

In such an embodiment, a vibration isolation structure need not be located at the connection point between the strut 1230 and the housing 1212 of the combination hydrofoil/propulsion pod 1250. Instead, this connection, which may also include a wiring connection 1204 for connecting the wiring 1206 extending within the strut 1230 to internal wiring within the housing 1212, may be a rigid connection. The use of a rigid connection may provide additional stability for the front and rear foils 1210 and 1208, so that at least a portion of the housing 1212 is rigidly connected to the strut 1230. Vibration isolation which prevents vibration from being transmitted through support components from the motor and propeller to the strut 1230 may instead be located within the housing 1212, aft of the strut 1230. This vibration isolating structure may include an elastomeric material or sheath internal to the housing 1212. For example, a larger elastomeric sheath may surround the motor and propeller within the housing, or the motor and propeller may be held in place via a plurality of discrete elastomeric structures, such as a plurality of elastomeric pads or bumpers. Alternatively, the motor and propeller, or a support frame supporting the motor and propeller, may be suspended at least partially within or behind the housing 1212 using vibration isolating mounts similar to those described herein. One or more elastomerically-sheathed through-pins or bolts may extend into or across an internal cavity within the housing 1212, and support the motor, propeller, a supporting frame, or a motor/propeller assembly, while preventing or inhibiting direct contact with rigid portions of the housing 1212.

Figure 13:
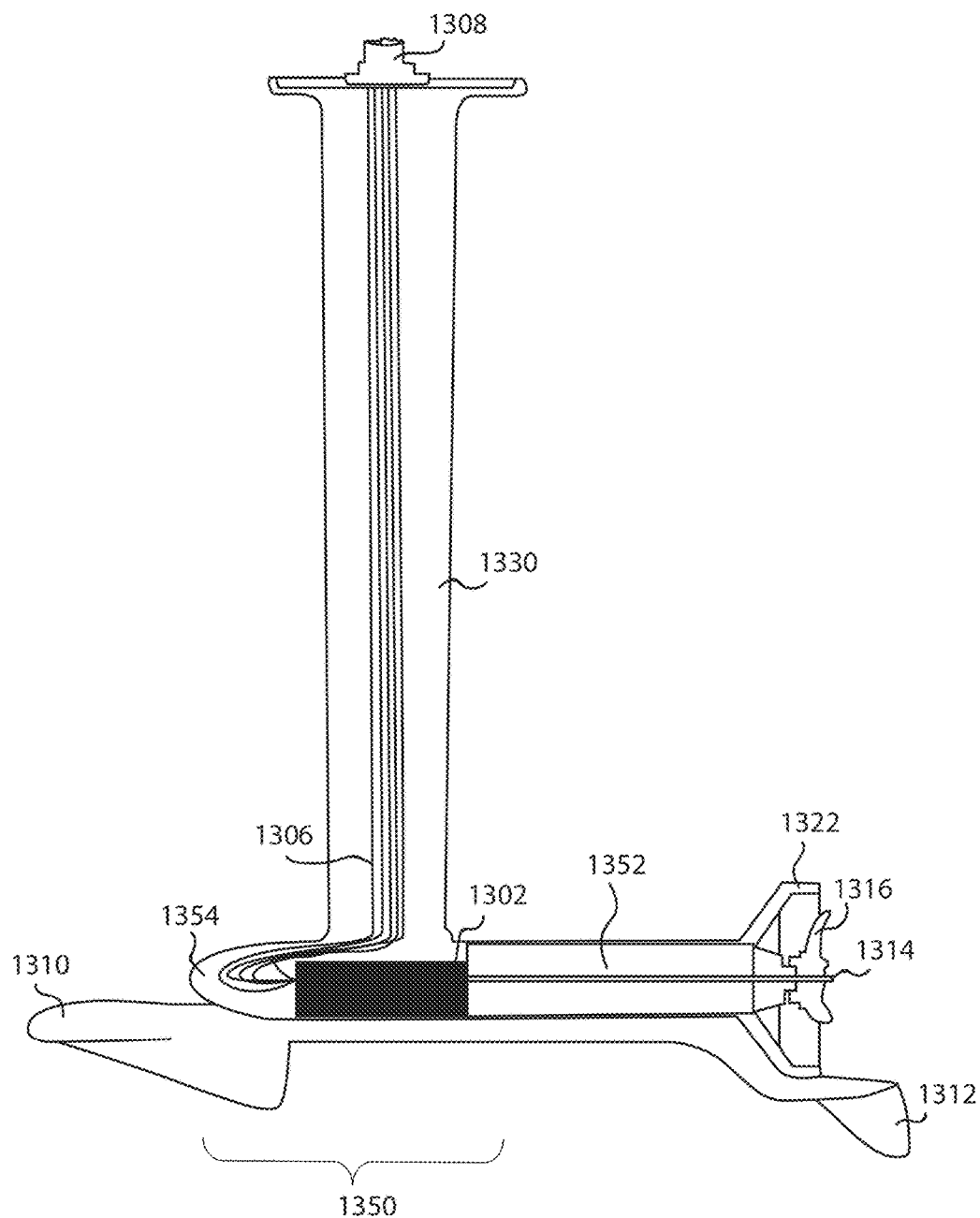
FIG. 13 is a cross-sectional view schematically illustrating another embodiment of a combination propulsion pod and hydrofoil structure, coupled to a strut at the base of the strut. is a cross-sectional view schematically illustrating another embodiment of a combination propulsion pod and hydrofoil structure, coupled to a strut at the base of the strut.

FIG. 13 is a cross-sectional view schematically illustrating another embodiment of a combination propulsion pod and hydrofoil structure, coupled to a strut at the base of the strut. The strut 1330 includes a connector 1308 at the upper end of the strut 1330, which is in electrical communication with wiring 1306 extending the length of the strut and connected to a drive 1302 within housing 1352. The drive 1302 may include, for example, at least one of a motor, gearbox, and controller. In the illustrated embodiment, the wiring 1352 is routed through a nosecone 1354 of the housing 1352. A propeller 1316 is surrounded by a protective shield structure 1322 and driven by an axle 1314 coupled to the drive 1302. In addition to supporting the drive 1302 and propeller 1316, the housing 1352 also supports front foil 1310 and rear foil 1312 to provide a combination hydrofoil/propulsion pod 1350. Any suitable vibration isolating structures, such as vibration isolating structures at least partially internal to the housing 1352, may be used to vibrationally isolate the drive 1302 and propeller 1316 to prevent vibrations generated by operation of those components being conducted through support structures up the strut 1330 and to a support platform such as a hydrofoil board. The vibration conducted by directly connected wiring 1306 may be minimal in comparison to the vibration which would otherwise be conducted via the support structures.

In some embodiments, non-structural methods of controlling noise and vibration may also be used, in place of or in addition to the structural features discussed herein. In some embodiments, the propulsion assembly may be operated in a manner which alters the noise and vibration generated by the operation of the hydrofoil watercraft. As discussed above, the noise and vibrations generated during the operation of a hydrofoil watercraft are dependent in part on the resonant frequencies of the various components of the hydrofoil watercraft. Because of the natural resonance of these components, certain motor speeds, for example, may generate forcing frequencies which result in substantially more noise and vibration than are generated at other motor speeds. Even a small change in motor speeds can result in a substantial difference in generated noise and vibration, by avoiding the generation of forcing frequencies which align with the natural resonance of the hydrofoil watercraft components.

In some embodiments, a motor controller may be configured to minimize operation at speeds which generate forcing frequencies corresponding to resonant frequencies of components of the hydrofoil watercraft. This may be done, for example through the use of a nonlinear transition rate between motor speeds, to minimize the time spent operating at a motor speed which may generate problematic forcing frequencies.

In some embodiments, the non-linear transition rate or other changes to the operation of the motor controller may be at least partially predefined, with the motor controller configured to minimize time spent at speeds known or expected to generate problematic forcing frequencies. This determination may be made, for example, on the basis of analysis of the hydrofoil watercraft design. In other embodiments, however, the non-linear transition rate or other changes to the operation of the motor controller may be at least partially dynamically determined or configured on the basis of a sensed response to operation of the specific hydrofoil watercraft and arrangement.

In some embodiments, this may be done as part of an initial or periodic configuration, in which the noise and/or vibration generated by the hydrofoil watercraft is measured over a range of motor speeds, and an appropriate non-linear transition profile generated on the bases of identifying motor speeds which generate problematic forcing frequencies. In particular, motor speeds may be identified where the problematic forcing frequencies are generated over a comparatively small range of motor speeds which may be sped through quickly, to reach another motor speed which generates less noise and/or vibration without a significant change in motor speed. In other embodiments, adjustments to motor control may be done in a dynamic fashion during operation of the controller, with real-time sensing of noise and/or vibration used to identify increases in noise or vibration, and dynamically adjust the control of the motor accordingly. This sensing can be performed by sensors internal to the hydrofoil watercraft itself, as well as by a separate device, such as a smartphone or wearable device of a user operating the hydrofoil watercraft in wireless or other communication with the hydrofoil watercraft.

Although described with respect to hydrofoil watercraft, vibration isolating mounts incorporating some or all of the features described herein may be used in a variety of other implementations, including other types of watercraft. For example, in some embodiments, an outboard motor may be suspended from a transom of a boat using a plurality of vibration isolating mounts to form a flexible coupling mechanism which isolates components which are rigidly coupled to the outboard motor from components which are rigidly coupled to the transom. In some particular embodiments, for example, these vibration isolating mounts may extend through apertures in the transom and be indirectly or directly rigidly coupled to the outboard motor at locations on opposite sides of the transom. A plurality of elastomeric bushings such as those discussed herein may be used to maintain vibration isolation of the outboard motor. Similar vibration isolating mounts may be used in other watercraft, including personal watercraft such as jetskis and other watercraft devices with closed hulls, as well as boats and other watercraft configured to seat multiple passengers.

While certain embodiments have been described, these embodiments have been presented by way of example only and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope of the disclosure.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Certain terminology may be used in the following description for the purpose of reference only, and thus is not intended to be limiting. For example, terms such as "upper", "lower", "upward", "downward", "above", "below", "top", "bottom", "left", and similar terms refer to directions in the drawings to which reference is made. Such terminology may include the words specifically mentioned above, derivatives thereof, and words of similar import. Similarly, the terms "first", "second", and other such numerical terms referring to structures neither imply a sequence or order unless clearly indicated by the context.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "spherical" or "circular" or "cylindrical" or "semi-circular" or "semi-cylindrical" or any related or similar terms, are not required to conform strictly to the mathematical definitions of spheres, circles, cylinders or other structures, but can encompass structures that are reasonably close approximations.

The terms "approximately," "about," and "substantially" as used herein represent an amount close to the stated amount that still performs a desired function or achieves a desired result. For example, in some embodiments, as the context may permit, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may permit, the term "generally parallel" can refer to something that departs from exactly parallel by less than or equal to 20 degrees. As another example, in certain embodiments, as the context may permit, the term "generally perpendicular" can refer to something that departs from exactly perpendicular by less than or equal to 20 degrees.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

Although the invention has been disclosed in the context of certain embodiments and examples, it will be understood by those skilled in the art that this disclosure extends beyond the specifically disclosed embodiments to other alternative embodiments and/or uses of the embodiments and certain modifications and equivalents thereof. The scope of the present disclosure is not intended to be limited by the specific disclosures of preferred embodiments in this section or elsewhere in this specification, and may be defined by claims as presented in this section or elsewhere in this specification or as presented in the future.

What is claimed is:

1. A watercraft, comprising:
   a support platform configured to support at least one passenger;
   a strut extending from the support platform;
   a hydrofoil mounted to the strut;
   a vibration isolating structure; and
   a propulsion mechanism flexibly mounted to the strut with the vibration isolating structure such that the vibration isolating structure inhibits rigid contact between the propulsion mechanism or a component coupled thereto and the strut or a component coupled thereto to vibrationally isolate the strut from the propulsion mechanism to reduce an intensity of vibrations transferred from the propulsion mechanism to the strut.

2. The watercraft of claim 1 wherein the vibration isolating structure inhibits direct contact between the propulsion mechanism or a component rigidly coupled thereto and the strut or a component rigidly coupled thereto.

3. The watercraft of claim 2 wherein the vibration isolating structure spaces the propulsion mechanism or component rigidly coupled thereto from the strut or component rigidly coupled thereto.

4. The watercraft of claim 1 wherein the vibration isolating structure includes an elastomeric material.

5. The watercraft of claim 1 further comprising an attachment housing mounting the propulsion mechanism to the strut, wherein the vibration isolating structure is between the strut or a component rigidly coupled, either directly or indirectly, to the strut and the attachment housing.

6. The watercraft of claim 1 wherein the vibration isolating structure is between the propulsion mechanism and a housing mounting the propulsion mechanism to the strut.

7. The watercraft of claim 1 wherein the vibration isolating structure includes an elastomeric sheath, and elastomeric sleeve, elastomeric bushing, elastomeric pad, elastomeric bushing, and/or elastomeric projection.

8. A watercraft, comprising:
a support platform configured to support at least one passenger;
a strut extending from the support platform;
a hydrofoil mounted to the strut;
a vibration isolating structure;
a propulsion mechanism flexibly mounted to the strut with the vibration isolating structure such that the vibration isolating structure reduces an intensity of vibrations transferred from the propulsion mechanism to the strut; and
a first clamp portion and a second clamp portion disposed on opposite sides of the strut, the first clamp portion and second clamp portion each including apertures through which fasteners extend to secure the propulsion mechanism to the strut.

9. The watercraft of claim 8 wherein the vibration isolating structure includes elastomeric bushings at the apertures.

10. The watercraft of claim 1 further comprising a propulsion pod fuselage housing including the propulsion mechanism, a portion of the propulsion pod fuselage housing rigidly coupled the strut and flexibly coupled to the propulsion mechanism.

11. A watercraft comprising:
a support platform configured to support at least one passenger;
a strut extending from the support platform;
a hydrofoil mounted to the strut;
a propulsion mechanism mounted to the strut; and
at least one elastomeric structure vibrationally isolating the propulsion mechanism from the strut by inhibiting rigid contact between the propulsion mechanism or a component coupled thereto and the strut or a component coupled thereto.

12. The watercraft of claim 11 wherein the at least one elastomeric structure inhibits direct contact between the propulsion mechanism or a component rigidly coupled thereto and the strut or a component rigidly coupled thereto.

13. The watercraft of claim 12 wherein the at least one elastomeric structure spaces the propulsion mechanism or component rigidly coupled thereto from the strut or component rigidly coupled thereto.

14. The watercraft of claim 11 further comprising an attachment housing mounting the propulsion mechanism to the strut, wherein the at least one elastomeric structure is between the strut or a component rigidly coupled, either directly or indirectly, to the strut and the attachment housing.

15. The watercraft of claim 11 wherein the at least one elastomeric structure is between the propulsion mechanism and a housing mounting the propulsion mechanism to the strut.

16. The watercraft of claim 11 wherein the at least one elastomeric structure includes an elastomeric sheath, and elastomeric sleeve, elastomeric bushing, elastomeric pad, elastomeric bushing, and/or elastomeric projection.

17. A watercraft comprising:
a support platform configured to support at least one passenger;
a strut extending from the support platform;
a hydrofoil mounted to the strut;
a propulsion mechanism mounted to the strut;
at least one elastomeric structure vibrationally isolating the propulsion mechanism from the strut; and
a first clamp portion and a second clamp portion disposed on opposite sides of the strut, the first clamp portion and second clamp portion each including apertures through which fasteners extend to secure the propulsion mechanism to the strut.

18. The watercraft of claim 17 wherein the at least one elastomeric structure includes elastomeric bushings at the apertures.

19. The watercraft of claim 11 further comprising a propulsion pod fuselage housing including the propulsion mechanism, a portion of the propulsion pod fuselage housing rigidly coupled the strut and flexibly coupled to the propulsion mechanism.

20. A vibration isolating mount comprising:
a propulsion pod mount housing having a first portion to be disposed on a first side of a strut and a second portion to be disposed on a second side of the strut, the first portion and second portion of the propulsion pod mount housing to be secured together about the strut and a portion of a propulsion pod to secure the propulsion pod to the strut; and
one or more elastomeric structures to be disposed between the strut and the first portion of the propulsion pod mount housing and between the strut and the second portion of the propulsion pod mount housing to vibrationally isolate the strut from the propulsion pod mount housing.

* * * * *

UNITED STATES PATENT AND TRADEMARK OFFICE
CERTIFICATE OF CORRECTION

Page 1 of 1

PATENT NO. : 12,330,747 B2
APPLICATION NO. : 18/371119
DATED : June 17, 2025
INVENTOR(S) : Montague et al.

It is certified that error appears in the above-identified patent and that said Letters Patent is hereby corrected as shown below:

In the Claims

In Column 25, Claim 7, Lines 17-19, delete "and elastomeric sleeve, elastomeric bushing, elastomeric pad, elastomeric bushing," and insert -- an elastomeric sleeve, elastomeric bushing, elastomeric pad, --, therefor.

In Column 25, Claim 10, Line 41, delete "coupled the" and insert -- coupled to the --, therefor.

In Column 26, Claim 16, Lines 16-18, delete "and elastomeric sleeve, elastomeric bushing, elastomeric pad, elastomeric bushing," and insert -- an elastomeric sleeve, elastomeric bushing, elastomeric pad, --, therefor.

In Column 26, Claim 19, Line 38, delete "coupled the" and insert -- coupled to the --, therefor.

Signed and Sealed this
Twenty-second Day of July, 2025

Coke Morgan Stewart
*Acting Director of the United States Patent and Trademark Office*